(12) United States Patent
Chakrabarti et al.

(10) Patent No.: US 6,356,899 B1
(45) Date of Patent: *Mar. 12, 2002

(54) METHOD FOR INTERACTIVELY CREATING AN INFORMATION DATABASE INCLUDING PREFERRED INFORMATION ELEMENTS, SUCH AS PREFERRED-AUTHORITY, WORLD WIDE WEB PAGES

(75) Inventors: Soumen Chakrabarti, Maharashtra (IN); Byron Edward Dom, Los Gatos, CA (US); David Andrew Gibson, Berkeley, CA (US); Prabhakar Raghavan, Saratoga, CA (US); Sridhar Rajagopalan, San Jose, CA (US); Shanmugasundaram Ravikumar, San Jose, CA (US); Andrew Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/261,926

(22) Filed: Mar. 3, 1999

Related U.S. Application Data

(63) Continuation-in-part of application No. 09/143,733, filed on Aug. 29, 1998.

(51) Int. Cl.[7] .............................................. G06F 17/30
(52) U.S. Cl. ..................... 707/5; 707/3; 707/4; 707/104
(58) Field of Search ............................ 707/1, 3, 4, 5, 707/104; 709/218, 219

(56) References Cited

U.S. PATENT DOCUMENTS

| | | | |
|---|---|---|---|
| 4,870,579 A | 9/1989 | Hey | 705/27 |
| 4,945,475 A | 7/1990 | Bruffey et al. | 707/1 |
| 4,996,642 A | 2/1991 | Hey | 705/27 |

(List continued on next page.)

OTHER PUBLICATIONS

Indexing for linear model–based information retrieval by—Yuan–Chi Chang; Chung–Sheng Li; IBM Thomas J. Watson Res. Center, Yorktown Heights, NY, USA ;in: Multimedia and Expo, 2000. ICME 2000. 2000 IEEE; International Conference; pp: 359–362.*

(List continued on next page.)

*Primary Examiner*—Diane D. Mizrahi
(74) *Attorney, Agent, or Firm*—John L. Rogitz

(57) ABSTRACT

A method for identifying, filtering, ranking and cataloging information elements; as for example, World Wide Web pages, of the Internet in whole, part, or in combination. The method is preferably implemented in computer software and features steps for enabling a user to interactively create an information database including preferred information elements such as preferred World Wide Web pages in whole, part, or in combination. The method includes steps for enabling a user to interactively create a frame-based, hierarchical organizational structure for the information elements, and steps for identifying and automatically filtering and ranking by relevance, information elements, such as World Wide Web pages for populating the structure, to form; for example, a searchable, World Wide Web page database. Additionally, the method features steps for enabling a user to interactively define a frame-based, hierarchical information structure for cataloging information, identifying a preliminary population of information elements for a particular hierarchical category arranged as a frame, based upon the respective frame attributes, and thereafter, expanding the information population to include related information, and subsequently, automatically filtering and ranking the information based upon relevance, and then populating the hierarchical structure with the a definable portion of the filtered, ranked information elements.

50 Claims, 19 Drawing Sheets

U.S. PATENT DOCUMENTS

| | | | | |
|---|---|---|---|---|
| 5,230,072 A | | 7/1993 | Smith et al. | 707/1 |
| 5,535,382 A | * | 7/1996 | Ogawa | 707/5 |
| 5,583,763 A | | 12/1996 | Atcheson et al. | 707/3 |
| 5,615,341 A | | 3/1997 | Agrawal et al. | 705/10 |
| 5,845,270 A | | 12/1998 | Schatz et al. | 706/11 |
| 5,940,821 A | * | 8/1999 | Wical | 707/3 |
| 5,987,454 A | * | 11/1999 | Hobbs | 707/4 |

OTHER PUBLICATIONS

Microsoft Office 6–in–1 New Edition(1994, pp. 1–13 by Que Corporations.*

Publication: "Inferring Web Communities from Link Topology." Gibson et al. Proceedings of the 9th ACM Conference on Hypertext and Hypermedia. pp 1–17. 1998.

Publication: "Automatic Resource Compilation by Analyzing Hyperlink Structure and Associated Text." Chakrabarti et al. Proceedings of the 7th World Wide Web Conference. 1998.

Publication: "Visualizing Rich, Structured Hypermedia". Keith Andrews, Information Visualization Short Note, Graz University of Technology, pp. 40. Jul., 1998.

Brochure: Microsoft Office 6–in–1, New Edition. Jul., 1994. (p. 1).

Publication: "Authoritative Sources in a Hyperlinked Environment". Kleinberg. Proceedings of the ACM–SIAM Symposium on Discrete Algorithms, pp. 1–31. 1998.

Publication: "Beehive: A System for Cooperative Filtering and Sharing of Information". Huberman et al. Dynamics of Computation Group, Xerox Palo Alto Research Center, Palo Alto, CA. pp. 1–9. Aug. 1996.

Publication: "Using Collaborative Filtering to Weave an Information Tapestry". Goldberg et al. Communication of the ACM. vol. 35, No. 12. Dec., 1992.

Publication: "The Strength of Weak Ties". Mark S. Granovetter. The American Journal of Sociology. vol. 78, No. 6. pp. 1360–1380, 1973.

Publication: "GroupLens: An Open Architecture for Collaborative Filtering of Netnews." Resnick et al. ACM. pp. 175–186. 1994.

Publication: "Knowledge Integration for Structured Information Sources Containing Text (Extended Abstract)". Cohen. SIGIR–97 Workshop on Networked Information Retrieval. pp. 0–17. Aug., 1997.

Publication: "Do–I–Care: A Collaborative Web Agent." Starr et al. CHI '96 Companion. pp. 273–274. Apr. 1996.

Publication: "Clustering and Information Sharing in an Ecology of Cooperating Agents." Leonard N. Foner. 1995.

Publication: "Evolving Agents For Personalized Information Filtering." Sheth et al. IEEE. pp. 345–352. 1993.

Publication: "Experiences with GroupLens: Making Usenet Useful Again." Miller et al. Annual Technical Conference. pp. 219–233. 1997.

Publication: "Recommender Systems." Resnick et al. Communications of the ACM. vol. 40., No.3, pp. 56–89. Mar., 1997.

Publication: "Recommending and Evaluating Choices in a Virtual Community of Use." Hill et al. CHI '95 Mosaic of Creativity, pp. 194–201. May, 1995.

Publication: "Pointing The Way: Active Collaborative Filtering." Maltz et al. CHI '95 Mosaic of Creativity, pp. 202–209. May, 1995.

Publication: Social Information Filtering: Algorithms for Automating "Word of Mouth." Shardanand et al. CHI '95 Mosaic of Creativity, pp. 210–217. May, 1995.

* cited by examiner

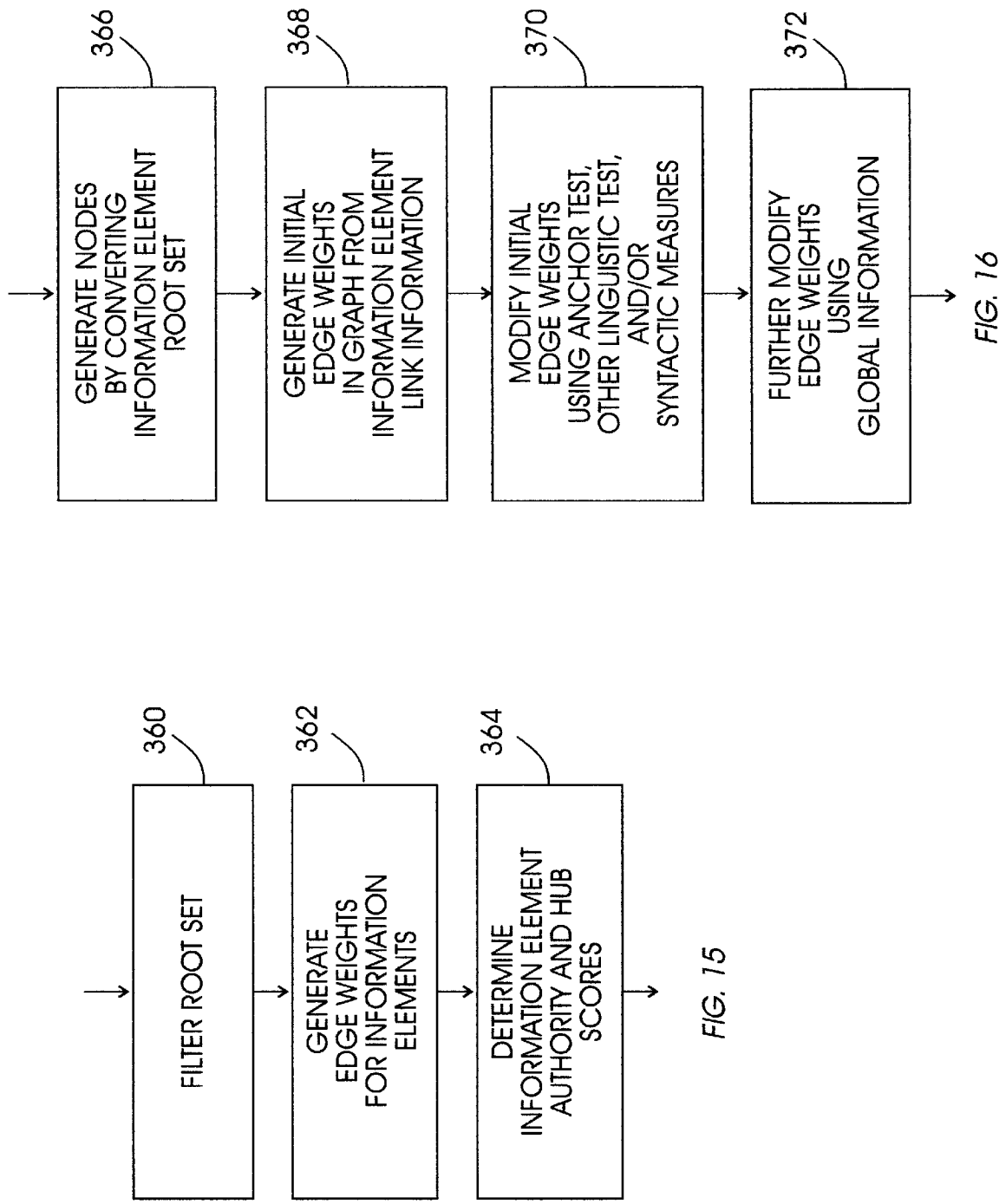

METHOD FOR INTERACTIVELY CREATING AN INFORMATION DATABASE INCLUDING PREFERRED INFORMATION ELEMENTS, SUCH AS PREFERRED-AUTHORITY, WORLD WIDE WEB PAGES

This application is a continuation-in-part of U.S. patent application Ser. No. 09/143,733, filed Aug. 29, 1998, for an invention entitled "A METHOD FOR INTERACTIVELY CREATING AN INFORMATION DATABASE INCLUDING PREFERRED INFORMATION ELEMENTS SUCH AS PREFERRED-AUTHORITY, WORLD WIDE WEB PAGES", from which priority is claimed.

BACKGROUND OF THE INVENTION

FIELD OF USE

This invention relates generally to a method for identifying, filtering, ranking and cataloging information elements; as for example, Internet, World Wide Web pages, considered in whole, in part, or in combination; and more particularly, to a method, preferably implemented in computer software, for interactively creating an information database including preferred information elements, the method including steps for enabling a user to interactively create a frame-based, hierarchical organizational structure for the information elements, and steps, thereafter, for identifying by iteration and automatically filtering and ranking by degree of relevance information elements, for populating the frames of the structure to form; for example, a searchable, World Wide Web page database. In further detail, the method features steps for enabling a user to interactively define a frame-based, hierarchical information structure for cataloging information, and, steps for identifying information elements to populate respective frames of the structure by iteration, the iteration including steps for: identifying a preliminary population of information elements with the use of a search query based on respective frame attributes, frame attributes selectively including classification designations, example pages, stop pages and/or control parameters used by conventional search engines, as required; supplementing preliminary population based on usage of example pages and/or stop pages; expanding the supplemented preliminary population to include related information; automatically filtering and computing information element ranking based on degree of relevance to the respective frame; and, thereafter, refining the identification with successive iterations of the steps described until identification is deemed complete, whereupon the hierarchical structure is populated with a user-defined portion of preferred information elements identified.

As a yet further problem, and potentially an even more perplexing one, not only has The computer revolution created a greater need for information, but, undeniably, it has created an abundance, indeed, an overabundance of information to meet that need. In fact, the computer revolution has spawned so much information, that it is now to the point where the amount of information available on most subjects is typically so large as to create the new and associated problems of going through that wealth of information, and selecting from it the items most relevant to the question at hand.

For example, in the case of the Internet's World Wide Web, if one were looking for information concerning something as straightforward as the restoration of an old car, there likely would be hundreds, if not thousands, of potential Web sites having as many if not more pages of information relating to the subject of old cars, and the parts, services and techniques for their restoration. Accordingly, one faced with the problem of developing information on the subject of automobile restoration, would potentially be required to locate and go through literally hundreds of Web pages in an attempt to find those few most suited to his needs.

In the past, the World Wide Web's approach to this problem has been to provide search facilities such as Yahoo®! and others, to assist Web users in finding the information; i.e., Web pages, they might be looking for. However, search facilities such as Yahoo! typically provide only generalized organizations of Web subject matter, those organizations being arranged as categories of Web pages, the categories and the things included in them being based on the nature of the Web sites, the subjective points of view of numerous staff classifiers working for the search facility, and the classification criteria they established. In accordance with this approach, organization of the information is, therefore, influenced by the respective points of view of the various classifiers, the providers of the search facilities, and the Web site providers. As a result, such Web subject matter organizations tend to be subjective and suffer from over inclusion and under inclusion of information, which, in turn, affects their relevance, accuracy and ease of use.

Moreover, and of yet greater concern, is the fact that formulating and maintaining organizations of Web subject matter in the fashion noted requires expenditure of substantial amounts of human time and effort and, accordingly, money. Particularly, continuous growth and change in Web makeup requires such organizations of Web information to be repeatedly supplemented and the existing framework revised to accommodate the introduction of new and changing information. Accordingly, such approaches are manpower intensive, leading to higher costs for creation and maintenance, and because of the extensive human involvement, are, as well, subject to error.

Still further, such search facilities, typically, are unable to group the information elements they return; e.g., Web pages, by their respective "relevance", that is, the degree to which others have referred to; i.e., pointed to, the respective elements; e.g., pages, as sources of information on the subject matter in question. Pages that have many references pointing to them are termed herein "authorities". In this scheme, and in the context of Web pages, "relevance" is a function of the number and quality of links to an authority page from various hub pages, referred to as the "authority weight" for the respective authority page, or, the number and quality of links from a hub page to various authority pages, referred to as the "hub weight" for the respective hub page. Moreover, and as will be appreciated, pages of higher relevance; i.e. higher authority weight or higher hub weight, are "preferred" where one is seeking information concerning particular subject matter. Accordingly, "preferred" information elements; e.g., Web pages, are considered to have higher relevance to some specific subject matter where the information elements; e.g., Web pages, have either, higher authority weight, or, higher hub weight with respect to the particular subject matter. And, as will also be appreciated, since information elements; e.g., Web pages, may both point to authority pages; i.e. function as a hub, and also be pointed to as an authority; i.e., function as an authority, such pages may be relevant either as a hub page or as authority page, or as both.

No prior references has proposed systems or methods for enabling a user to interactively create an information database of "preferred" data elements such as "preferred" Web pages; i.e., pages of either higher authority weight, or hub weight; i.e. "relevance", or, procedures for removing spurious factors that arise during computation of hub and authority weights for the respective pages.

With regard to relevance; i.e. weight, computation, workers in the field have found that the computational accuracy is adversely affected by such factors as "self-promotion", "related-page promotion,", "hub redundancy", "copied pages", and "false authority." Particularly, it has been found that during relevance computations pages with links to other pages of the same Web site can improperly confer authority upon themselves, thus giving rise to false promotion; i.e., "self-promotion," and adversely affecting relevance computation accuracy. Further, it has been found that in addition to self-promotion, related pages from the same Web site, as for example, a home page and several sub-pages of the home page can improperly accumulate authority weights, giving rise to false promotion in the form of "related-page promotion", which again adversely affects relevance computation accuracy.

Further still, workers have found that a page may have value only because of the hub links it contains; that is, its content may be otherwise irrelevant. In that case, if the hub links for such a page can be found in other pages, the hub links of such a page are redundant and may not be suitable for inclusion. It is to be noted that often, the value of a hub page resides in the links that it possesses, and not the content of the page. Accordingly, where all the links of a hub page can be found in "better" hub pages; i.e., hub pages having greater numbers of relevant links, and where the content of the hub page is otherwise not of interest, inclusion of the first hub page gives rise to "hub redundancy" which reduces the effectiveness of the computation.

Continuing, spurious results have also been found to be introduced into relevance computations by the now common practice of Web site providers including in their sites material copied from other Web sites. Because of the economic and creative pressures on Web site providers to produce "content", providers often copy page or page parts from others rather than generate new and original material for their sites. Though this approach may violate rights of the originator in the work, since little effort or cost is required, Web site providers find this a particularly fast and convenient way of generating site content, and are especially inclined to take this approach where the subject matter copied has become popular.

Regrettably, however, existence of multiple copies of hub and/or authority pages adversely affect relevance computations. For example, multiple copies of hub pages erroneously increase the authority weight of pages pointed to, the same material being pointed to each time a hub is copied. Likewise, multiple copies of authority pages also produce problems. Particularly, copies of the same authority page split; i.e. divide, the number of links pointing to the same subject matter; i.e., the hubs links pointing to the authority subject matter are dispersed over the copies. As will be appreciated, if there was only one copy of the authority, all hubs links for the authority would point to that one copy, thereby, consolidating the effect of the links. However, if the hub links rather point to different ones of the multiple authority copies, the total number of links that would otherwise be available is dissipated over the multiple copies. Accordingly, and as is apparent, the occurrence of "copied pages" adversely affects accuracy of the relevance computation.

And, still further, it has been found that certain pages pertaining to a number of unrelated topics; e.g., pages of resource compilations, typically refer to; i.e., are linked to, a number of other pages, and accordingly appear as if they are "good hubs," even though many of the associated links point to pages of unrelated subject matter, which in turn causes the relevant links from the same page to become "false authorities", which, once again, adversely affects the accuracy of relevance computation.

In addition, not only have previously proposed methods concerning links and computation of hub and authority weights failed to suggest or disclose interactive creation of information databases for preferred-authority data elements such as Web pages, or, procedures for removing spurious factors that arise during computation of the relevance weights, but further, prior approaches have failed to appreciate the importance and benefit derived from including "example" pages which may be "seeded" into the computation so as to drive computation in a desired direction; i.e., identify pages considered relevant to the subject matter of interest. Likewise, prior methods concerning hub and authority weight computations have also failed to consider express exclusion from computation of pages found not desirable, such non-desirable pages serving to bias the computation in unwanted directions; i.e., identify pages considered irrelevant to the subject matter of interest.

With respect to previously proposed methods concerning computation of hub and authority weights, J. Kleinberg, for example, in his U.S. patent application entitled: "Method and System for Identifying Authoritative Information Resources in an Environment with Content-based Links Between Information Resources", Ser. No. 08/813,749, filed Mar. 7, 1997 and now U.S. Pat. No. 6,112,202 and assigned to the assignee of the current application, describes a method for automatically identifying the most authoritative Web pages from a large set of hyperlinked Web pages. More specifically, Kleinberg explains his method applies to the cases where; for example, one has a page whose content is of interest, and desires to find other pages which are authoritative with respect to the content of the page of interest. However, while Kleinberg notes his method includes: steps for conducting a search based upon a query composed from the content of the page of interest; steps for, thereafter, expanding the group of pages initially retrieved with pages that are linked to the pages initially retrieved; and finally, steps for iteratively computing the relevance of the pages retrieved based upon the "weights" for the respective page link structures, his method fails to consider the interactive creation by a user of a database structure for the information, or optimization of the relevance computation by removal of spurious factors which adversely effect accuracy. Still further, Kleinberg fails to consider inclusion and/or exclusion, respectively, of desirable and undesirable information elements to influence the results of computation.

Likewise, S. Chakrabarti et al. in their pending U.S. patent application entitled, "Method and System for Filtering of Information Entities", Ser. No. 08/947,221 filed Oct. 8, 1997, also assigned to the assignee of the current application, describes a method for determining the "affinity" of information elements, the method including steps for first obtaining an initial set of information elements, thereafter, steps for expanding the initial set with "related" information elements, and subsequently, iteratively computing the relative affinity for the respective information elements. However, as in the case of Kleinberg, Chakrabarti et. al. fail to consider or describe facilities for enabling a user to interactive create a database structure for the information, or optimization of the "affinity" computation by removing spurious factors which adversely effect accuracy. Yet further, Chakrabarti et al., like Kleinberg, fail to disclose or suggest procedures for aiding computation by the inclusion of steps for introducing example information elements; e.g., example Web pages, into the process in order to direct the computation in a desired direction, or excluding undesired information elements; e.g., undesired Web pages, from the process in order to avoid the computation being taken in undesired directions.

SUMMARY OF THE INVENTION

Accordingly, it is an object of the present invention to provide a method for identifying, ranking and cataloging information.

Additionally, it is an object of the present invention to provide a method for interactively creating and or modifying an information database including preferred information elements such as preferred, World Wide Web pages, considered in whole, in part, or in combination.

Further, it is an object of the present invention to provide a method for improving the determination of relevance amongst related information elements such as hyperlinked, Web pages, considered in whole, in part or in combination.

Yet further, it is an object of the present invention to provide a method for improving the determination of relevance amongst related information elements such as Web pages, considered in whole, in part, or in combination, by the filtering to reduce the effects of spurious factors which adversely effect accuracy.

Still further, it is an object of the present invention to provide a method for enabling a user to interactively develop a personalized database structure for information organized in accordance with the user preferences, which may be subsequently populated with preferred information elements such as hyperlinked, World Wide Web pages collected by the user.

Yet further, it is also an object of the present invention to provide a method for improving the determination of relevance amongst related information elements such as Web pages by introducing example information elements such as example Web pages into the process to direct the determination in a desired direction.

As well, it is an object of the present invention to provide a method for improving the determination of relevance amongst related information elements such as Web pages by excluding undesired information elements such as undesired Web pages from the process to avoid the determination being taken in undesired directions.

Yet additionally, it is also an object of the present invention to provide a method for enabling users to interactively develop databases of preferred information elements, which databases may be subsequently searched conveniently and efficiently to identify information elements such as World Wide Web pages, in whole, in part or in combination. having relevance to subject matter of interest.

Briefly, to achieve at least one of the above and other objects and advantages, the method of the present invention features steps for enabling a user to interactively create and/or modify an information database having a hierarchical, frame-based organizational structure of the user's selection, the frames of the structure for receiving automatically retrieved, preferred information elements, such as World Wide Web pages, taken in whole, in part, or in combination, the pages being preferred based on relevance to respective frames, the preferred pages being identified by information queries submitted by the user for search, and subsequent computation and filtering of page relevance undertaken by iteration.

More specifically, in accordance with the method, the information elements are defined as, one or more statements of authority that form a unit of reference, such as part, or all of a Web page, or a number of Web pages in combination, that are found to have relevance to subject matter of interest as determined by improved, automated computation of weights for link between information elements; e.g., weights for hyperlink between Web pages. Additionally, the method features procedures for filtering the information elements to diminish spurious effects which adversely affect computation of relevance. Still further, the invention in preferred form includes steps for introducing into the process example information elements; e.g., example Web pages, found to be desirable so as to bias the computations in a desired direction, and steps for excluding undesired information elements; e.g., Web pages, so as to suppress biasing of the computation in unwanted directions.

In the interests of simplicity, and to assist understanding, in the following discussion and throughout the specification, usage of the more specific terms "page(s)" and "Web site(s)" will be employed to exemplify, and should be understood to embrace, respectively, the more general terms "information element(s)" and "information source(s)" unless otherwise expressly stated. Further, and as noted, an information element will be considered as including one or more statements of authority, as for example, one or more Web page hyperlinks, contained in a Web page, part of a page, or a number of Web pages, which form a unit of reference.

With the above in mind, it is to be noted that in preferred form, the method of the present invention is implemented in computer software suitable to be run on a conventional personal computer having a central processing unit, associated RAM, ROM and disk storage memory, and accompanying input-output devices, such as keyboard, pointing device, display monitor and printer. In preferred form the method includes program steps for facilitating generation of a display; at; for example, the computer monitor, the display featuring an interface for enabling a user to interactively compose and or modify an adjustable, frame-based, hierarchical organizational structure representing an arrangement of topics of the user's design. In accordance with the invention, the user formulates the frame-based organization structure to receive information elements, such as Web pages, in whole, in part or in combination, which may be subsequently automatically collected with the method employing further input from the user to populate the various frames of the organizational structure based on the respective frame attributes, which attributes may include classification designations, example pages, stop pages and/ or control parameters used by conventional search engines, as required.

In preferred form, the interface includes one or more screens respectively having multiple partitions for presenting: a graphical representation of the frame-based, hierarchical information structure of the users creation; the Web pages contained in the category frames of the structure, and the components employed in selecting the Web pages for populating the frames. More particularly, the interface features a graphical presentation of the frame-based hierarchical information structure, together with associated tools for freely navigating and modifying the structure; as for example, by adding, deleting or moving frames within the structure to represent the tastes and preferences of the user. Additionally, the interface includes partitions for displaying the Web pages associated with a user-selected frame of the organizational structure, together with tools for manipulating and managing the pages included at the frame. And, still further in preferred form, the interface includes partitions and associated tools for enabling the user to view respective Web page content, such as pages and page links, associated with selected frames, and the frame attributes.

Based on this interface presentation, the user may create search queries for identifying pages which following iterative processing may be employed to populate the frames of the organizational structure. In this regard, classification designations, example pages, stop pages and control parameters may be selectively and alternatively combined as required to form query terms employed in the iterative identification process.

Also in this regard, it is to be understood that frame attributes may function as contributors to query terms, and that various query terms may be used for multiple purposes. For example, frame attributes may contribute query terms appropriate for use in generating an initial set of Web pages for consideration, and additionally be employed for determining link weights during computation. More specifically, while frame attributes may define the subject matter categories of the organizational structure; i.e., function as classification designators, and, therefore, be suitable for initially retrieving pages relevant to those categories, the frame attributes as query terms may also be used to increase the weight afforded a link by virtue of the query term falling within a predetermined "window" of text from the link, thereby, suggesting heightened relevance for the link by virtue of its proximity to the query term as will be more fully described in connection with the detailed description of the preferred embodiment hereafter.

Further, frame attributes as query terms may also include, and, indeed, exclusively include identification of example hub pages and authority pages, the identities of which may be made part of a query to bias the relevance computation in desired directions. Additionally, and as noted, query terms may also include stop pages, i.e., identification of pages for avoidance which have been found to bias the relevance computation in undesired directions, as well as control parameters helpful for managing the extent and amount of CPU, memory and storage resources used during searching, as are well known in the art.

Also in preferred form, computation of Web page relevance is undertaken by defining a Web page and its associated links, as embracing a hub page, and/or an authority page, wherein a hub page, "points to"; i.e., links to, one or more authorities pages, and an authority page, is "pointed to"; i.e. linked to, by one or more hub pages. In this regard, and as noted, usage of the term "Web page" applies to part of a page, a whole page, and a combination of pages which may, respectively, constitute one or more statements of authority that form a unit of reference.

Continuing, the method includes steps for constructing a "root set" of Web pages likely to be relevant to a topic selected by the user. The root set is developed by first generating an initial set of Web pages with the use of a conventional query derived from the local and inherited attributes of the category frame for the database hierarchical organizational structure the user is interested in populating, the query so derived, thereafter, being first applied in conventional fashion against the World Wide Web. As described, frame attributes may selectively include frame classification designations, example pages, stop pages, and/or control parameters, as required.

Following return of the initial set of pages responsive to the query, the initial set is supplemented based on whether example pages and/or stop pages were specified. Particularly, in the case where example hubs were specified, preferably, any page pointed to by an example hub is used to supplement the initial set; i.e., brought into the initial set. Further, in the case where example authority pages were specified, the initial set is preferably supplemented by including any page that points to at least any two example authority pages. Additionally, to the extent that stop pages have been specified in the query, such stop pages are eliminated from the initial set. Further, once the initial set is supplemented as described, the supplemented initial set is then expanded by including pages directly linked to pages of the supplemented initial set; i.e., pages that are either pointed to by pages of the supplemented initial set, or pages that point to pages of the supplemented initial set, which, as will be appreciated, would include specified example hub pages and specified example authority pages. Finally, the specified stop pages would again be eliminated from the expanded, supplemented initial set; i.e., root set, to cover the possibility of stop pages having been drawn in during the expansion process.

In this regard, the method thus includes steps for generating an initial set of pages based upon frame attributes as described, and then through an iterative process of issuing queries and following links into and out of already fetched pages, the iteration is carried out until as described the initial set is supplemented and expanded to form the "root set" upon which later computation can be performed.

Following creation of the root set, the method includes steps for associating a hub-weight parameter and authority-weight parameter with each Web page, and iteratively calculating the relevance for the pages of the root set based on the resulting, respective, hub-weight and authority-weight values for each page.

In accordance with the method, the hub weights and authority weights of the respective pages are based on summations of respective authority weights and hub weights for the links of the pages. In this regard, and, as will be described hereafter, weights for respective links may be increased to reflect the significance of the link. In accordance with the method, the calculation produces a distribution of scores that represent the degree of relevance for the respective pages, which scores are, thereafter, ordered by numerical value to establish rankings of the pages. Specifically, the computation produces hub and authority weights for all pages, and then returns both a predetermined portion of the highest-ranking hub pages and highest-ranking authority pages.

In accordance with the invention, the method additionally features steps for improving computational accuracy of the relevance for the Web pages. Specifically, the method features steps executed during the computation of relevance for filtering spurious computational factors such as "self-promotion", "related-page promotion", "hub redundancy", "copied pages" and "false authority." In preferred form, the method includes steps for filtering "self-promotion" from the computation, the steps including the discarding of objectionable links between pages, from the same Web Site. Further the method includes steps for filtering "related-page promotion" from the computation, which steps include "re-packing" the Web pages, for any Web site, having multiple pages showing non-zero authority, during which re-packing, all authorities other that the largest authority being set to zero.

Still further, the method in preferred form also includes steps for filtering "hub redundancy", the steps including identifying the highest weight; i.e., "best," hub during computation, zeroing the authority values of all pages pointed to by that hub, re-computing hub values; and thereafter, outputting the next best hub, zeroing authority values of pages it points to, and so forth.

Regarding "copied pages", the method in preferred form also features steps for diminishing the adverse effect on relevance computation caused by copied pages. Specifically, the method features steps prior to computation of relevance for determining whether two or more pages can be considered copies of one another by means of a "similarity" checking procedure, canceling all but one of the pages, the retained page being deemed the original, redirecting the links to the copies found to the page deemed the original, and increasing the weight of the links from the page deemed the original by adding a factor representing the significance of the multiple copies of the original page having been made. Particularly, in preferred form, the factor used to increase link weight for links of copied pages is made equal to the log of the number of copies found of the page.

And, yet additionally the method in preferred form features steps for filtering "false authority", the steps including: allowing each link in a Web page to have its own hub value; incrementing the authority value of the destination page with the hub value of the link when authority values are calculated; and re-computing the hub values of the original link with the authority value of the destination page, and accordingly, by a spreading function, the hub values of neighboring links. Furthermore, the final hub value of the page, is made the sum of the hub values of its links.

Further, and as noted, in connection with computation of page hub weight and authority weight, respective weights of link within a page may be increased beyond a default value to reflect relevance. For example, first, where a query term appears at a distance "d" within a window "W" of terms from the link, a factor is added to link weight which is made proportional to [W–d]. As will be appreciated, the physical proximity of a search term to a link implies relevance for the link to the search term and, accordingly, the query. Additionally, and thereafter, where copied pages have been found, and all but one deemed the original eliminated, to reflect the significance of the page having been copied, the weight of the links for the retained page are increased, particularly, and as noted, by a multiplication factor equal to the log of the number of copies applied to link weight. Subsequently, and still further, where example pages are used, because of the importance of respective example pages, the weight of their respective links within an example page are likewise increased. More specifically, the weights of all links within example hub pages are increased by a predetermined multiplication factor; and in the case of example authority pages, the weight of links within an authority page are increased by first identifying a page region, and thereafter, applying a multiplication factor to the weight of any link within the region depending on the number of example links found within a window of predetermined size located at such a subject link within the identified region.

Still further, in preferred form, the method in accordance with the invention includes steps for ranking the pages of the root set based on relevance following computation of page hub and authority weights, and to thereafter, truncating the root set to a number of highest ranking pages prescribed by the user.

DESCRIPTION OF THE DRAWINGS

The above and further objects, features and advantages of the invention will become apparent from the following more detailed description when read with reference to the accompanying drawings in which:

FIG. 15 is a flow diagram illustrating the more specific steps associated with the "Ranking Information Elements Of Root Set" step of FIG. 12, FIG. 12 itself illustrating the "Populate Selected Frame With Information Elements" general step of the method in accordance with the present invention illustrated in FIG. 9;

FIG. 16 is a flow diagram illustrating the more specific steps associated with the "Generate Weights For Information Elements" of FIG. 15, FIG. 15 itself illustrating the "Rank Information Elements Of Root Set of FIG. 12, FIG. 12 itself illustrating the "Populate Selected Frame With Information Elements" general step of the method in accordance with the present invention illustrated in FIG. 9.

DETAILED DESCRIPTION OF THE PREFERRED EMBODIMENT

The method of the present invention, overcomes problems found in prior approaches to organization and retrieval of information; as for example, pages of the World Wide Web, by providing a method for identifying, filtering, ranking, and cataloging information, and, particularly, Web pages. More specifically, the method is preferably implemented in computer software suitable for being run on a conventional personal computer and includes steps for enabling a user to interactively create and or modify an information database featuring a hierarchical, frame-based, organizational structure of the user's selection for receiving information elements, such as World Wide Web pages, also of the user's selection. Further, the method features steps for enabling the identification of information elements, such as Web pages, in whole, in part or in combination, which based upon relevance as determined by improved, automated computation of the link structure between information elements, are considered preferred.

As will be appreciated by those skilled in the art, while the method of this invention has application to use by individuals for creating personalized, preferred-authority; e.g., high-authority, information databases, which may be developed from information sources such as the World Wide Web, in which the user can tailor the information organization to his tastes, the invention also has application to broad, business applications, not only for commercially cataloging information sources such as the World Wide Web, and providing facilities for distilling information retrieved to the higher levels of authority, but also, to such applications as building preferred-authority databases for use in law, medicine, engineering and other fields.

Figure 9:
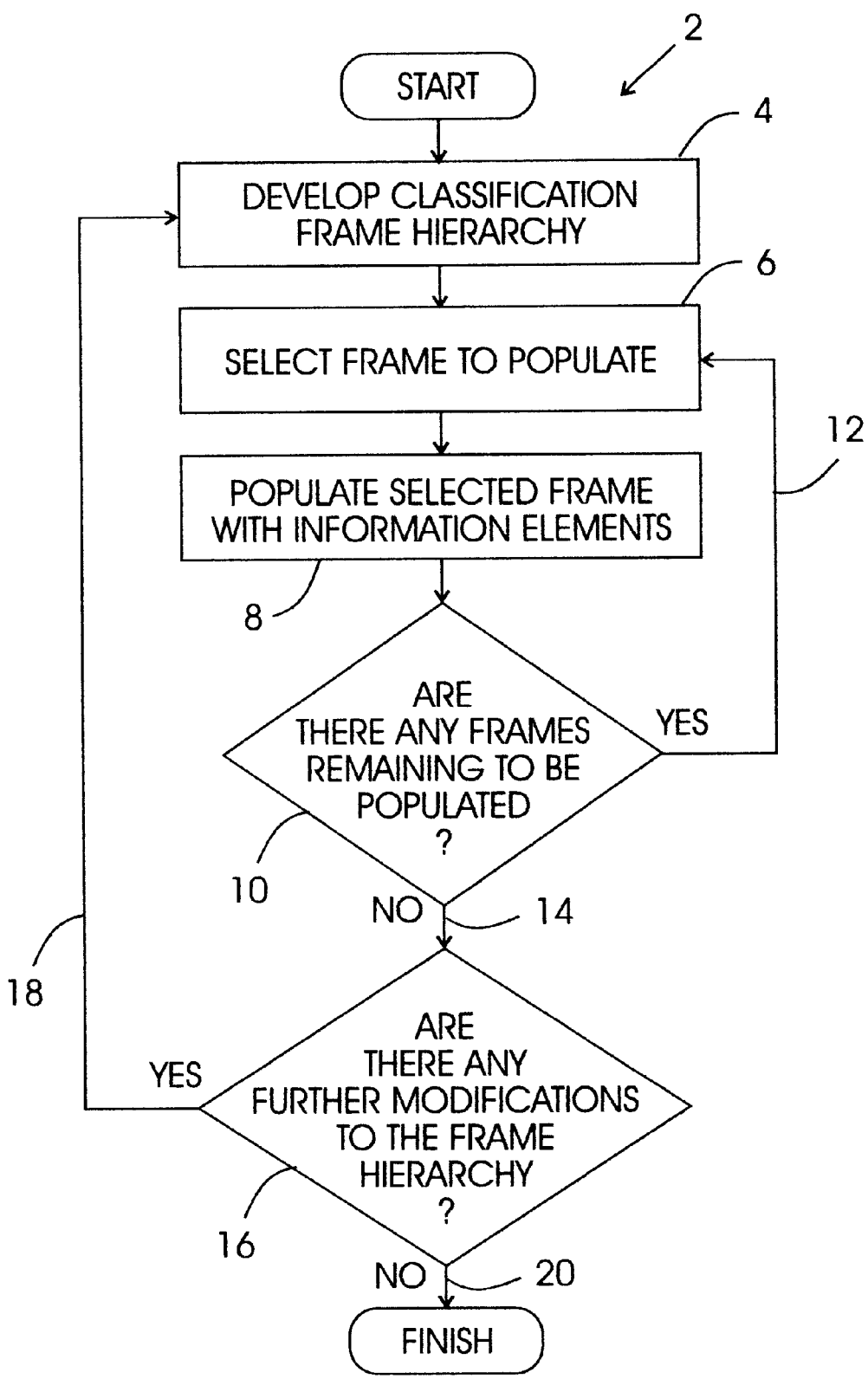
FIG. 9 is a flow diagram illustrating the general steps of the method in accordance with the present invention.

The method in accordance with the present invention is shown in its general aspect in FIG. 9. As shown there, method 2 is seen to broadly include step 4 for enabling a user to develop a personalized, frame-based, hierarchical information classification structure for the database. Further, following developments of the frame-based, hierarchical, information classification structure at step 4, method 2 is seen to include step 6 for enabling the user to select; i.e., randomly access, the information frame from the classification hierarchy he wishes to populate with information elements; e.g., Web pages.

Following user selection of the hierarchical classification frame to be populated, at step 6, method 2 includes step 8 for enabling the automated retrieval of information elements; e.g. Web pages, from the information source; e.g., the Web, for populating the selected frame. Thereafter, method 2 includes step 10 for prompting the user to indicate whether there are any other frames in the information classification hierarchy the user would like to populate with information. If the user indicates, there are additional frames of the classification hierarchy to be populated, method 2 returns at branch 12 to select frame step 6, where the user is again permitted to designate a frame to be populated, followed by subsequent transition to step 8 for enabling automated retrieval of information for the newly selected frame.

As will be appreciated, the noted sequence of frame selection at step 6, automated population of the frame at step 8, and query at step 10 as to whether any frames remain to be populated with information, would continue until the user has considered all the frames he wishes to populate.

Once all the frames the user wishes to populate had been exhausted, method 2 advances over program-flow branch 14 to step 16, where the user is prompted to indicate whether there are any modifications of the information classification frame hierarchy which the user would like to undertake. In the case where the user would like to make changes to the classification structure; e.g., the addition, deletion or movement of any frames, method 2 would advance over program-flow branch 18 back to classification developments step 4, at which the user would be enabled to enter desired modifications to the information classification organizational structure.

Thereafter, and as would be appreciated by those skilled in the art, following entry of all desired modifications to the information classification structure, method 2 program flow would again advance through method steps 6, 8 and 12 to enable population of, and modifications to the information classification frame structure as described above.

Finally, following information population of any modifications to the classification structure, the user, at step 16, would again be prompted to indicate whether any further changes to the classification structure were desired. If the user then indicates that no further modifications to the information classification structure are desired, method 2 would advance over program-flow branch 20 to finish.

As would be appreciated, and as noted above, the method of the present invention has application to a broad range of information sources. However, for the sake of clarity and simplicity, but, with no sense of limitation, the following more detailed description of method 2 will be undertaken with reference to the World Wide Web and the information pages available there.

Figure 1:
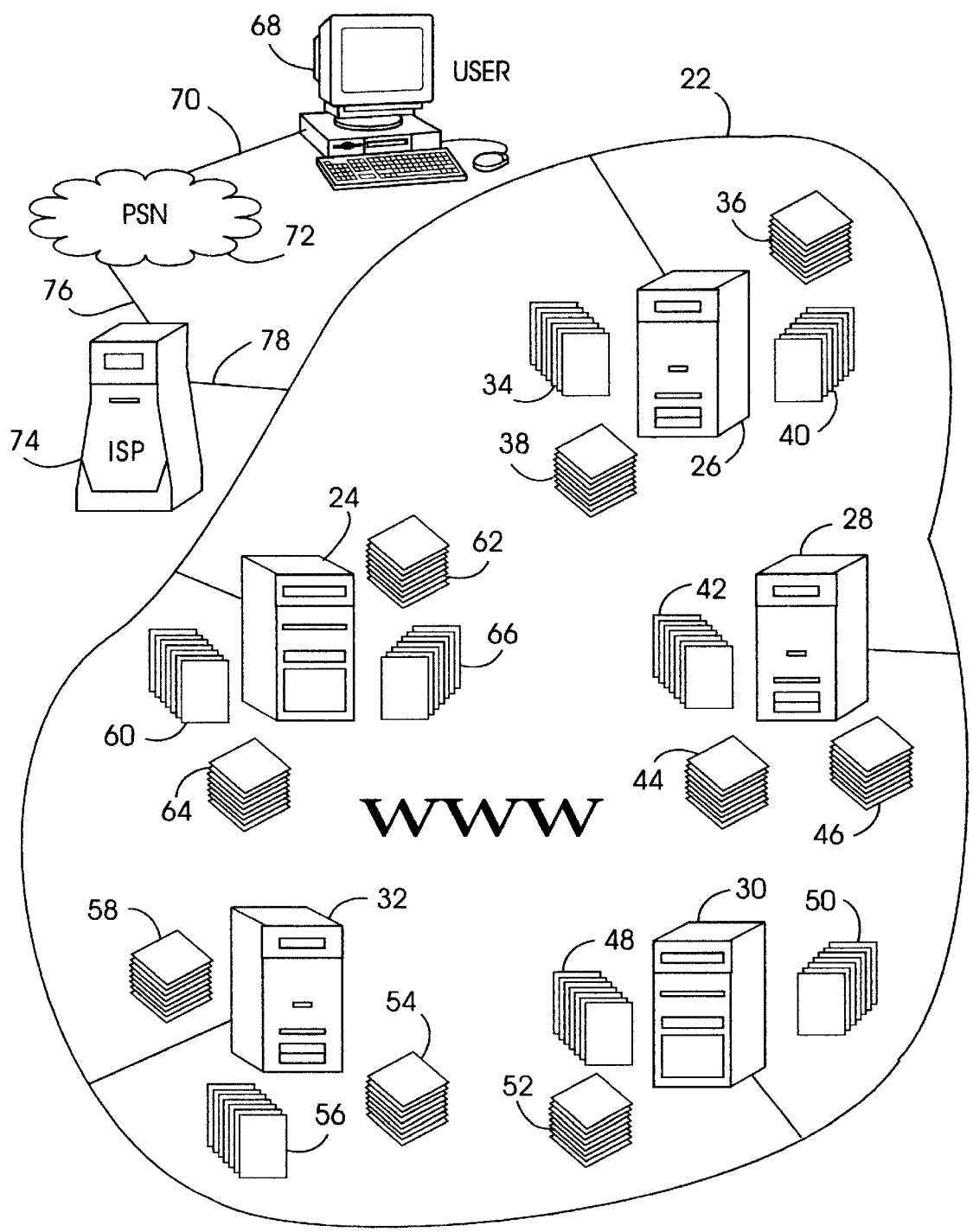
FIG. 1 is a diagram illustrating an Internet, environment including a number of World Wide Web site and associated servers having page information suitable for being maintained in a frame-based, hierarchical database created or maintained in accordance with the method of the present invention.

As noted, the World Wide Web of the Internet, referred to here for simplicity as the "Web", represents a valuable and important information resource, including literally hundreds of millions of documents accessed by tens of millions of users daily. With reference to FIG. 1, as is well known, Web 22 includes millions of Web sites, several of which, for purposes of illustration, are schematically represented as Web site servers 24 to 32, it being understood that a single server might host one or more sites. Additionally, and as shown, each Web site 24 to 32 includes numerous information pages arranged in Web applications; e.g., Web sites, Web site databases, etc., 34 to 66. Further, and as is also well known, a user, at his personal computer 68 equipped with a suitable Web browser and communications software, can access Web 22 over his ordinary phone line 70, the public switching network 72, and through an Internet service provider 74, which itself may be connected to public switching network 72 by an ordinary telephone line 76 and to Web 22 by one or more high-speed data lines and indicated collectively cable 78. And, with this setup and some computer communication protocol magic, the user can access the literally hundreds on millions of documents available at applications 34 to 66, and others like them, on Web 22.

As pointed out, however, this great mass of information presents difficulties for the user in the form of retrieval and organization problems. And, as also pointed out, method 2 of the present invention provides the user with a means for dealing with those problems.

Particularly, and as noted in connection with the above description of the broad aspects of the invention, method 2 provides solutions to those problems in the form of steps for enabling the user to interactively create an information database having a organizational structure which the user can interactively personalize to his tastes for holding the information he retrieves, and steps for, thereafter, enabling automated filtering, and retrieval of reduced size; i.e., distilled, collections of preferred Web pages responsive to queries based on the information organizational structure the user has created.

Figure 10:
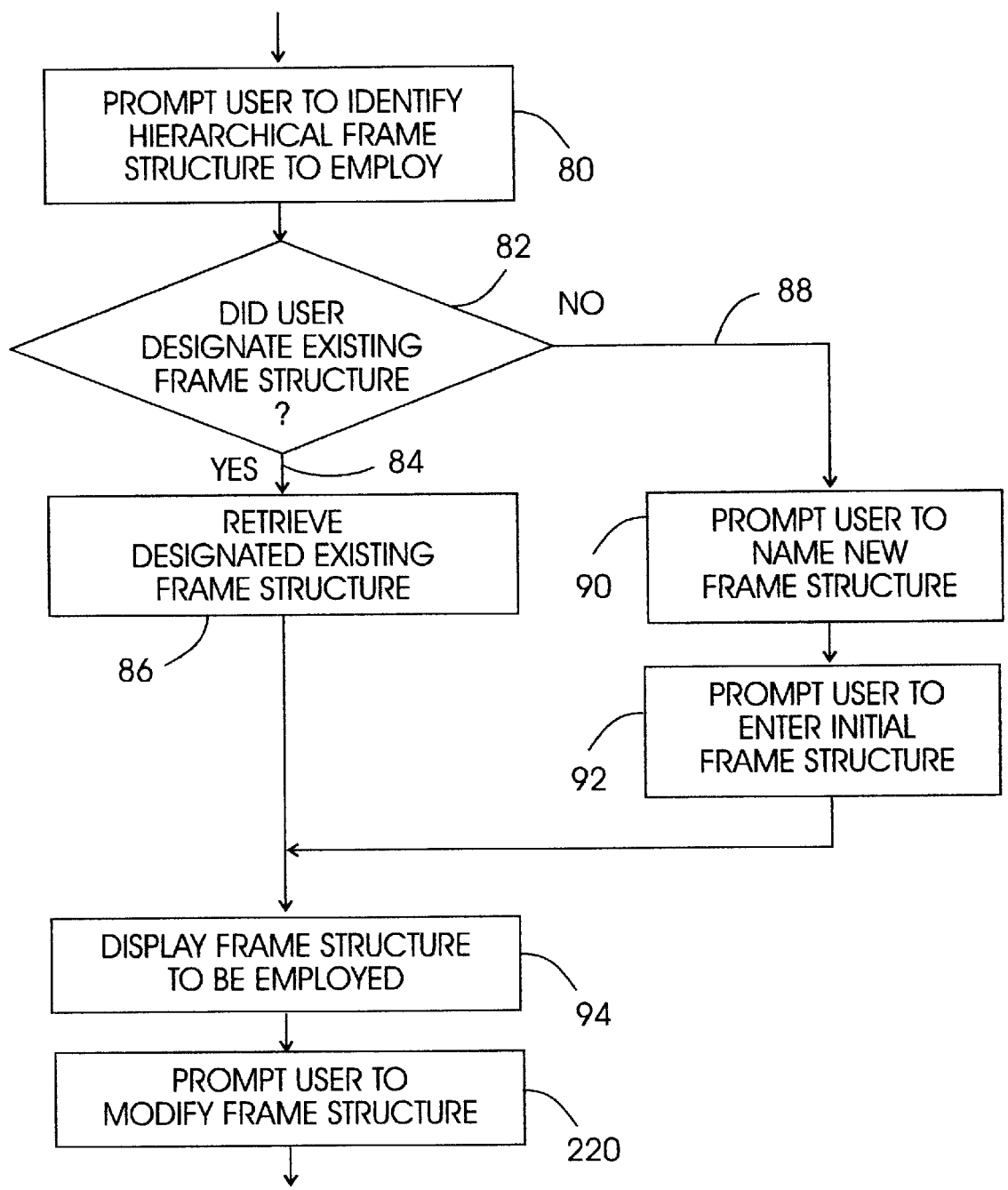
FIG. 10 is a flow diagram illustrating the more specific steps associated with the "Develop Classification Frame Hierarchy" general step of the method in accordance with the present invention illustrated in FIG. 9.

As described in connection with FIG. 9, method 2 broadly includes step 4 for enabling the user to develop a frame-based, hierarchical information classification structure for his personalized database. As shown in FIG. 10, step 4 of method 2 includes a serious of more detailed steps for carrying out that procedure. Specifically, and with reference to FIG. 10, classification developments step 4 is seen to include step 80 which follows activation of the software in which method 2 is implemented and embodied at users personal computer 68, step 80 prompting the user to identify; i.e., provide, the file name and path, of the hierarchical database frame structure method 2 should initially access.

As will be appreciated, in the case where the user has previously developed a database structure, he could call it at this point, and continue with its use and evolution.

In the alternative, where the user wishes to develop a new structure, but, one having some similarity to the preexisting structure, he could designate the preexisting structure and employ it as a basis for the new structure and database. In such case, however, the user would be required to rename the preexisting structure if he intended to retain it, otherwise, in conventional fashion, the preexisting structure, as modified would be saved under the original structure filename, thus corrupting the original structure.

In the case, where no preexisting structure is available, the user may simple start from, scratch; i.e., from nothing, indicate a new name for the structure to be created, and proceed.

Continuing with reference to FIG. 10, following prompt step 80, method 2 is seen to include step 82 which, responsive to the user's designation, causes program flow to advance either over branch 84 to retrieve at step 86 any preexisting structure which the user has identified, or over branch 88 in the case where the user has indicated he is going to develop a new structure. Where the user indicates he is going to develop a new frame structure, method 2 program flow advances over branch 88 to step 90 at which the user is prompted to provide the name for the new classification structure. Following step 90, and the user's submission of an identification for the new structure, method 2 advances to step 92 where the user is prompted to provide an initial structure element; e.g., a classification frame, for the new structure. Subsequently, method 2 program-flow advances from either step 86, for retrieval of a designated preexisting frame structure, or from step 92 for initiation of a new frame structure, to converge at step 94, where method 2 displays the frame structure to begin processing with.

With regard to the information structure, experience has shown, hierarchically organized data and, particularly frame-based, hierarchically organized data featuring representations of information categories as a hierarchy of frames having frame attributes and attribute values, that characterize and distinguish the respective frames and their associations to each other provides a representation that enable users to more readily understand and appreciate the information elements and their relationships. Still further, it has also been found that the hierarchical organization of information enables a much speedier search when information is sought to be retrieved. Particularly, when a particular element of information is sought, identification of its category affiliation not only designates the features to be looked for, but also, immediately excludes features, and other aspects of the organizational structure not to be looked for, thus more immediately directing the search to the relevant section of the organization.

Figure 2A:
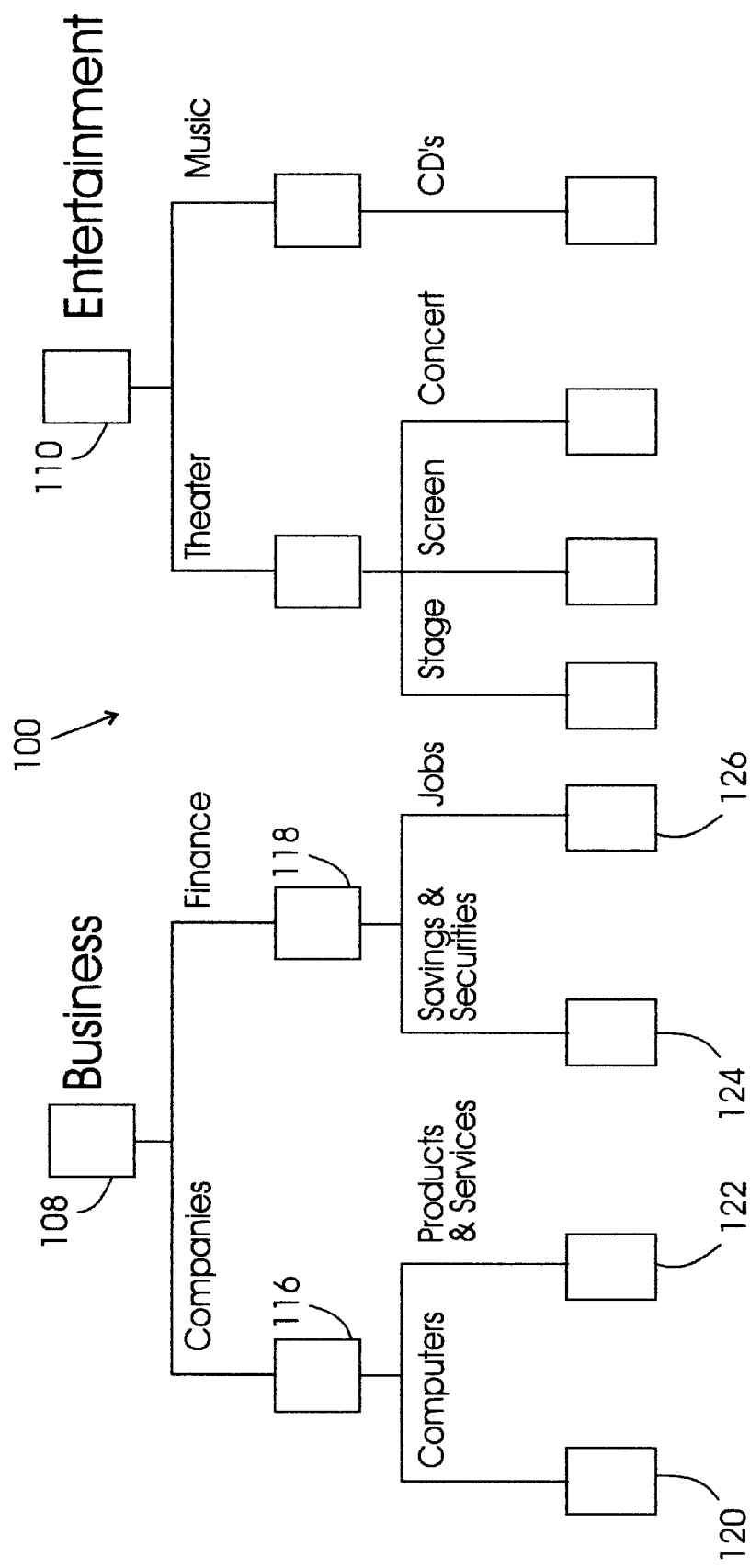
FIGS. 2(A–B) is a diagram illustrating a hierarchical organization of information suitable for being maintained in a frame-based, hierarchical database created or maintained in accordance with the method of the present invention.
Figure 2B:
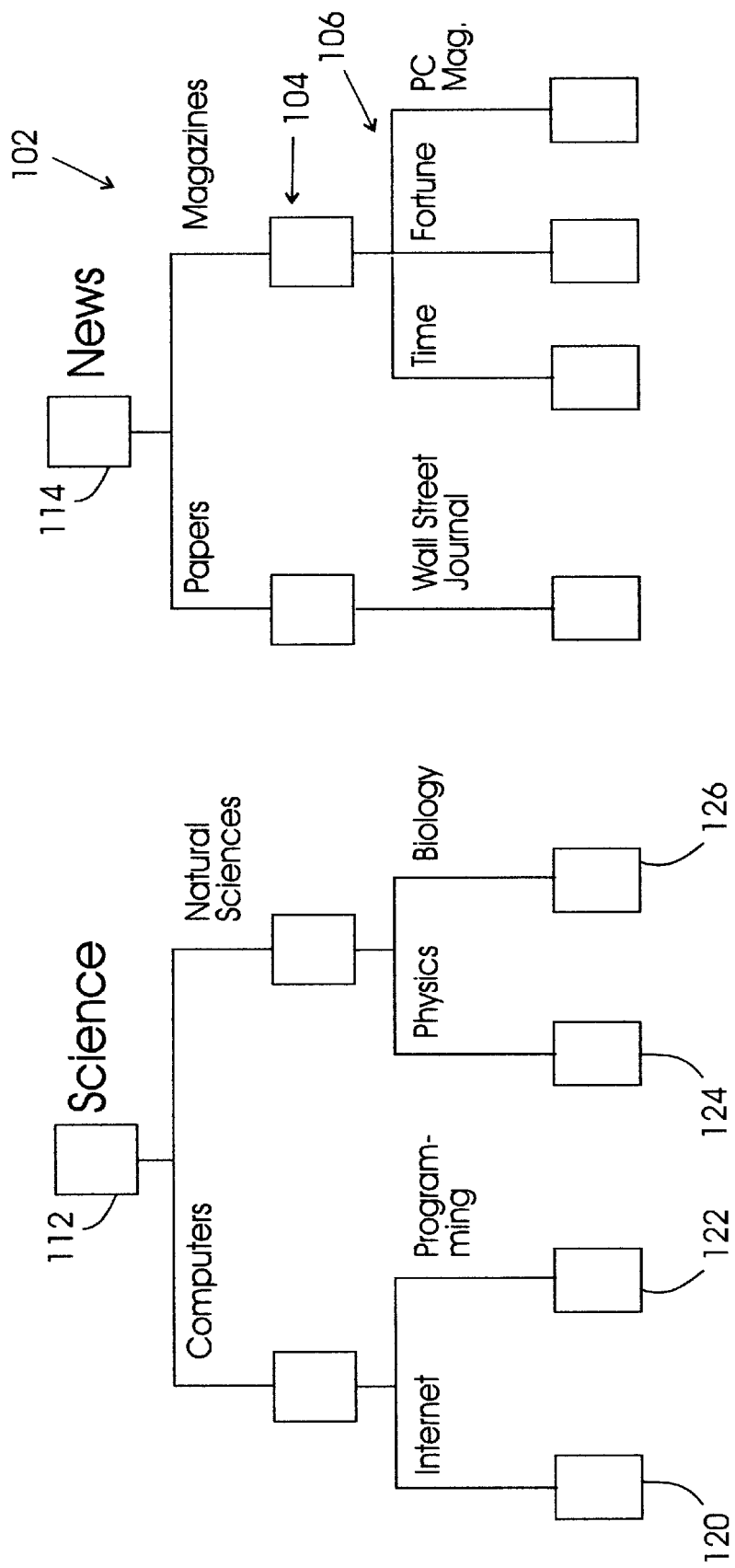
Figure 3A:
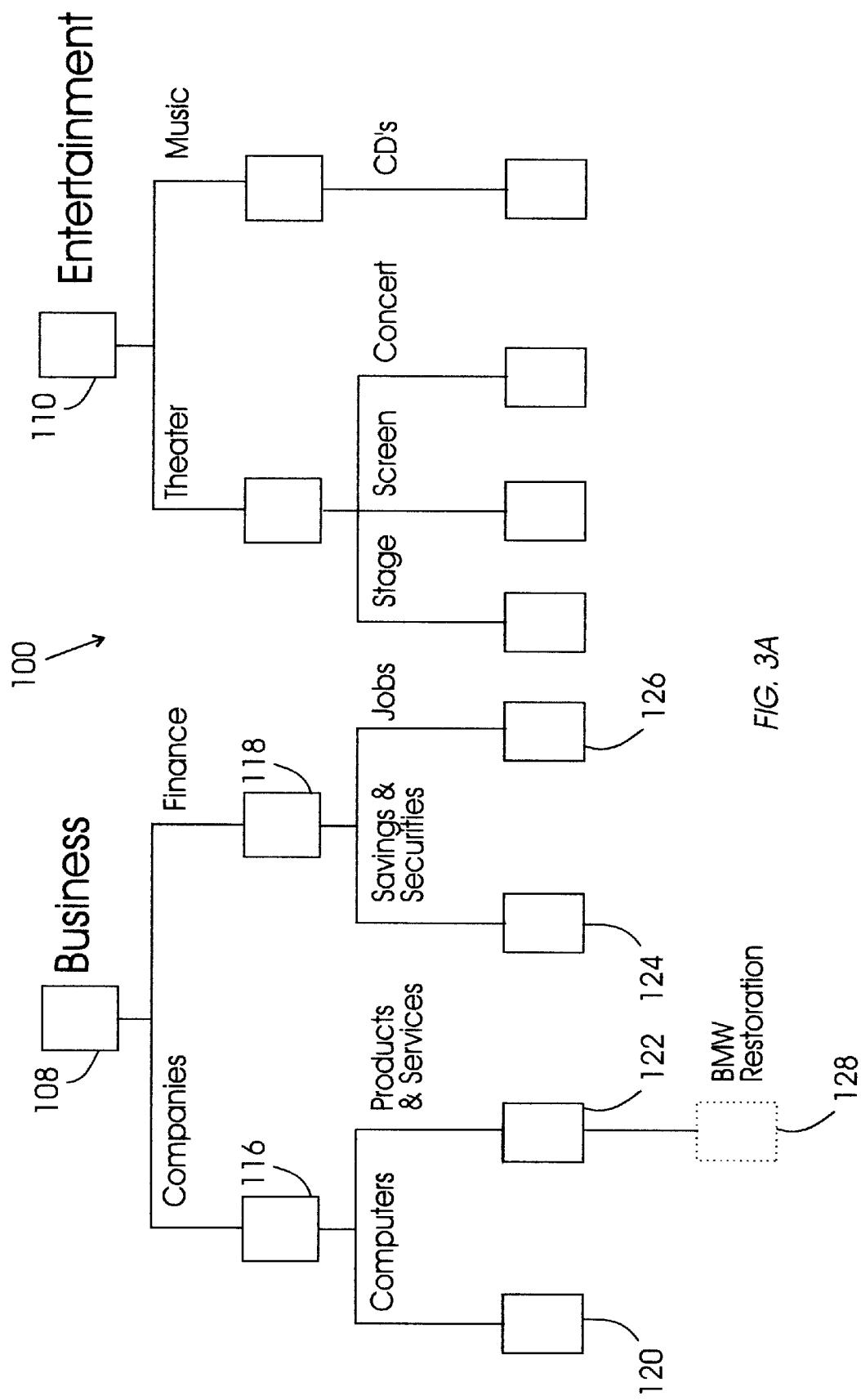
FIGS. 3(A–B) is a diagram illustrating a hierarchical organization of information suitable for being maintained in a frame-based, hierarchical database in which a new information category frame has been suggested for addition in accordance with the method of the present invention.
Figure 3B:
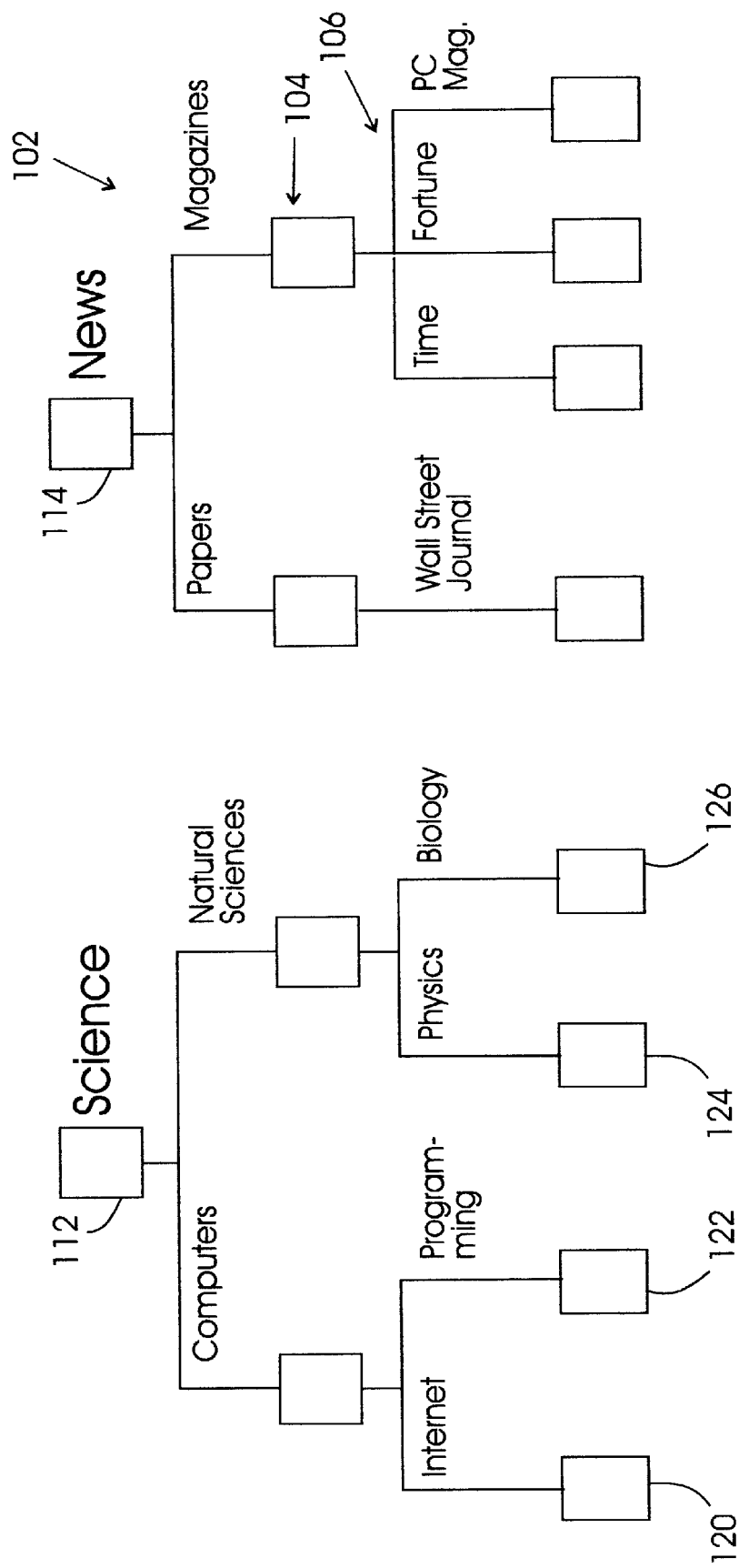

Accordingly, method 2 in preferred form, supports frame-based, hierarchical organizational structures for the information the user seeks to catalog. FIG. 2 illustrates such an organizational structure.

As shown in FIG. 2, a frame-based, hierarchical organization structure 100 which was previously created, is seen to include a plurality of frames arrayed in hierarchical relation for representing a general classification of information. As is well understood in the art, the respective frames feature attributes and attribute values for identifying the nature of each frame and its relationships to the other frames. Particularly, frame attributes and attribute values may include classification descriptors for identifying distinguishing characteristics of the respective frames, and further, in accordance with method 2, include additional parameters helpful in identifying preferred pages; i.e. higher relevance pages, for populating the respective frames. More specifically, in preferred form, frame attributes and attribute values may include example pages intended to bias iterative identification of preferred pages for populating respective frames in directions deemed desirable. Additionally, frame attributes may also include stop pages; i.e., pages found to bias iterative identification of preferred pages in directions deemed undesirable, which pages are to be excluded from processing. Yet further, frame attributes and attribute values may also include control parameters known in the art which a search engine may use to assistant generating sets pages in accordance with method 2. More specifically, control may include parameters helpful for managing the extent and amount of CPU, memory and storage resources used during searching, as are well known in the art.

Continuing, in accordance with association rules commonly employed in hierarchical organizations, attributes appearing at a particular frame level in the hierarchy, will be inherited by or may otherwise influence all depending frames of lower hierarchical level. Further, within a level, frames may be given different attributes and or different attribute values, in the form of descriptors to, thereby, identify different subcategory types within the category level.

The nature of frame relationships may be readily understood with reference to structure 100. As seen in FIG. 2, structure 100 features three levels of organization, 102 to 106, the highest and most general 102, including four frames, specifically frames 108 concerning "Business", 110 concerning "Entertainment", 112 concerning "Science", and 114 concerning "News." Beneath frame 108 to 114 is a second categorization level 104 which further defines first level 102. Particularly, and for ease of explanation, with reference to frame 108 "Business", only, structure 100 is seen to feature frames 116 "Companies" and 118 "Finance", both of which depend from frame 102. And, beneath frames 116,118, structure 100 is further seen to include a third category level 106 which yet additionally defines second level 104 and first level 102. Particularly, third level 106 is seen to include frames 120, "Computers"; 122 "Products & Services"; 124, "Savings & Securities"; and 126, "Job," frames 120 and 122 depending from frame 116, "Companies" and frames 124 and 126 from frame 118, "Finance."

Accordingly, based on the frame structure and associated classification descriptor frame attributes and attribute values just described, it would follow that frame 122, "Products &Services", as a "child" of frame 116, "Companies" and "grandchild" or frame 108, "Business", in view of the above discussion concerning attribute inheritance, carry the classification descriptor limitations of its progenitors. Specifically, frame 120 would be considered to include product and service information of business companies, only.

In the case where a user intending to employ structure 100 for organizing his information found such limitations inappropriate or undesirable, in accordance with the present invention, he could readily undertake interactive modification of structure 100.

While at first blush, this may seem straight forward, those skilled in the database art will appreciate that in the past, is was not readily possible to modify database structure, as to do so would typically require reloading of the database data. As is apparent, from the above discussion of hierarchical frame attribute inheritance rules, if a frame in a hierarchy is changed, the limitations associated with related frames of the hierarchical structure; e.g., parent, child, related frames, must also change, thus potentially causing data previously held at a frame prior to a frame structure change, to no longer be appropriate for the same frame after a modification of the structure.

The invention, provides steps for easily and quickly identifying information for re-populating modified frames, and additionally and independently by providing steps for supporting a display interface that enables the user to readily add, delete, or move frames within a hierarchical information organizational structure.

Figure 5:
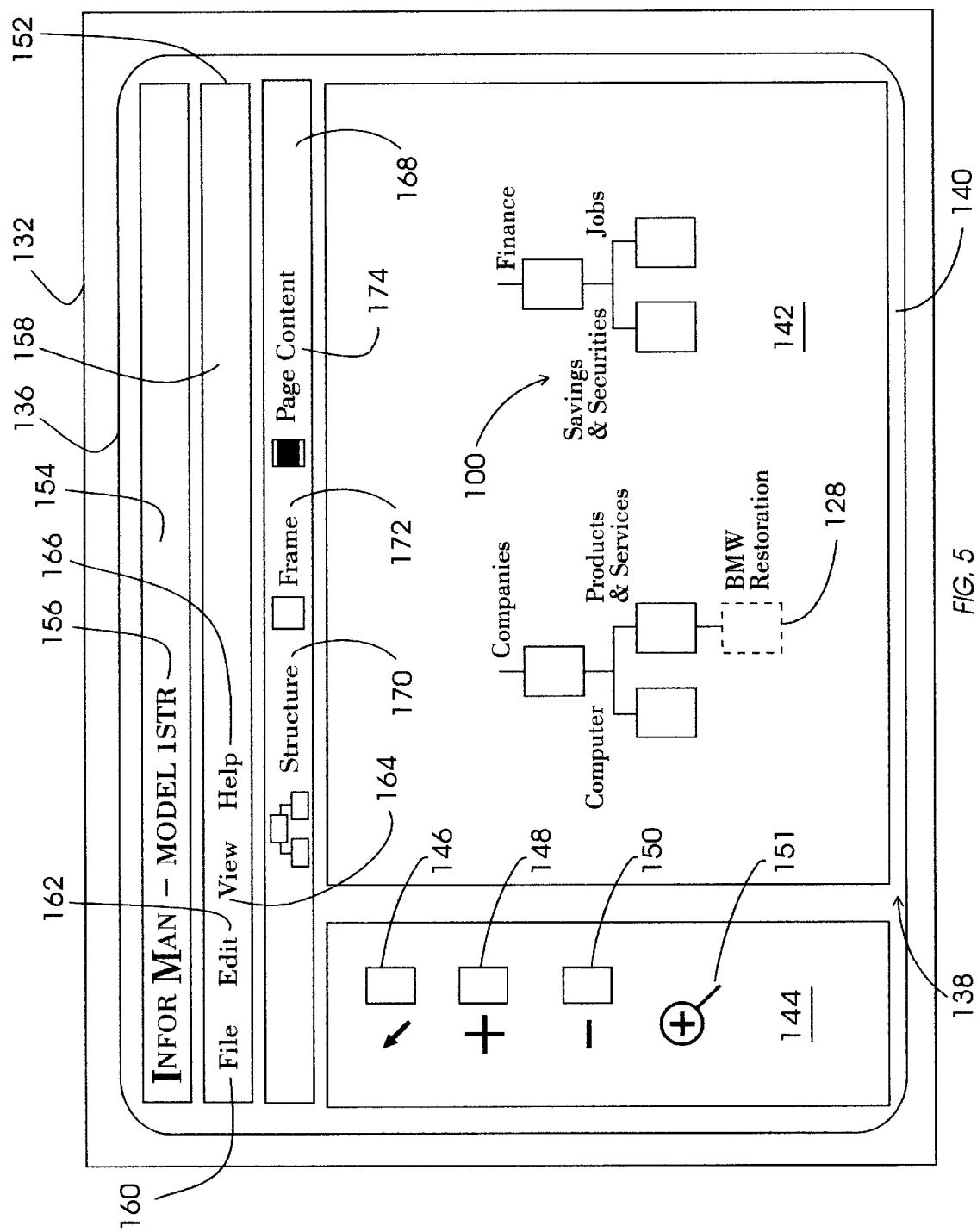
FIG. 5 is a schematic illustration of the display interface presented to a user for enabling creation or modification of a database hierarchical organizational structure in accordance with the method of the present invention.

To facilitate this, method 2 of the present invention features steps for presenting a display at the monitor of user's computer 68 for enabling the user to interactively and easily modify structure 100. With reference to FIG. 5, user's computer 68 is seen to have a monitor 132 featuring a display 136 at which interface 138 in accordance with method 2 is provided. In accordance with the invention, method 2 includes program steps for furnishing interface 138 with one or more screens having multiple partitions. As shown in FIG. 5, interface 138 in preferred form is seen to include a first screen 140 having a partition 142 for displaying the hierarchical, information organizational structure 100. Additionally, interface screen 140 is seen to have a second partition 144, including graphically presented tools for modifying structure 100. Specifically, tool partition 138 for screen 140 is seen to include a tool 146 for selecting frames of structure 100. Additionally, tool partition 138 is also seen to include tools 148 and 150 for respectively adding and deleting frames from structure 100. In accordance with the invention method 2, includes program steps for enabling a user to also freely move frames within structure 100 using selection tool 146 in conventional "drag-and-drop" fashion. Still further, tool partition 138 is seen to include a "zoom" tool 151 for enabling the user to zoom in and zoom out organizational structure 100 to see, respectively, fewer or more frames, thereby aiding the user's perspective in laying out and modifying structure 100.

Yet additionally, interface screen 140 is also seen to have a partition 152 including a section 154 for identifying the filename 156 associated with organizational structure 100. Further, partition 152 is also seen to include a section 158 including " drop-down" menus in conventional "Windows" fashion for enabling management of interface 138. In preferred form, the menus include elements, such as, "File" 160, "Edit" 162, "View" 164 and "Help" 166. Still further, screen partition 152 is also seen to include a section 168 having interface mode buttons for enabling movement between interface mode screens. More specifically, section 168 of partition 152 is seen to include a mode button 170 "Structure" for viewing organizational structure 100 at screen partition 142, a mode button 172 for viewing the information element; e.g. Web page content of any frame selected with selection tool 146 as will be more fully described below. Finally, section 168 of screen partition 152 is also seen to include a mode button 174 for viewing the contact of the respective information elements; e.g. Web pages, populating a particular frame of structure of 100, as also will be described more fully below.

Figure 6:
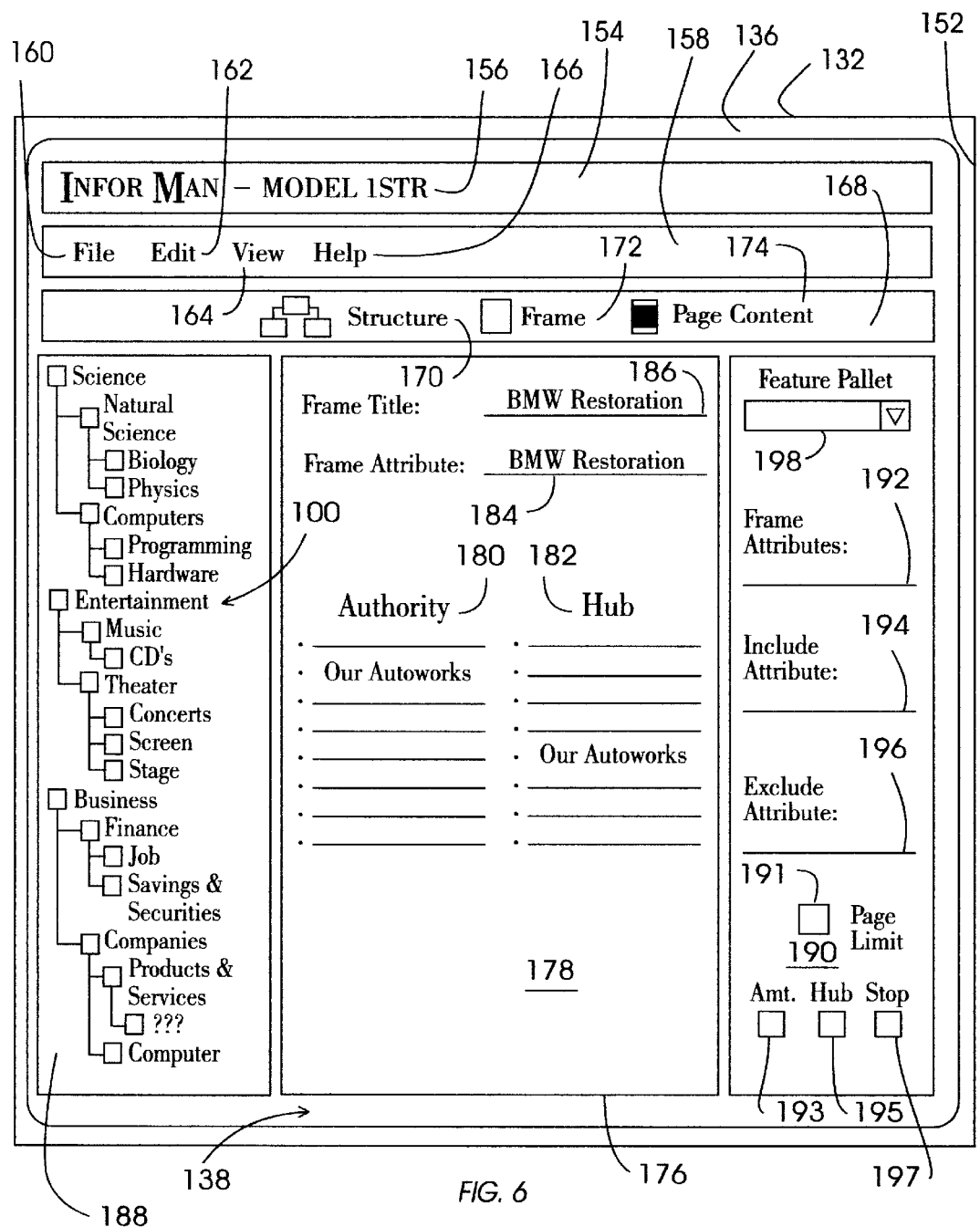
FIG. 6 is a schematic illustration of the display interface presented to a user for disclosing the page population of an information frame of a database hierarchical organizational structure in accordance with the method of the present invention.

Continuing with reference to FIG. 6, screen interface 138 in preferred form is also seen to include a second screen 176 having multiple partitions. Specifically, screen 176 is seen to include a partition 178 for displaying the information elements; e.g. Web pages, which populate a particular frame of organizational structure 100. In accordance with the invention, method 2 includes steps for presenting the pages of a frame identified as authorities at column 180, and pages identified as hubs at column 182. Further, partition 178 is also seen to include presentation of the attributes, specifically classification descriptors, for the frame of structure 100 being presented at partition 178 at partition region 184, and the title for the respective frame at partition region 186.

As also seen in FIG. 6, interface screen 176 further includes a partition 188 for displaying frame structure 100. In accordance with method 2, structure 100 at partition 188 may be readily scrolled in typical "Windows-Explorer" fashion. In this manner, control of the frame content at partition 178 may be readily effected by selecting frames of structure 100 in conventional fashion; as for example, with a mouse pointer. Also in preferred form, frames of structure 100 may again be freely managed; for example, added, deleted and moved at partition 188.

Continuing, screen 176 in accord with method 2 is also seen to include a partition 190 for enabling editing of the frame page content. More specifically, partition 190 is seen to include information entry fields, 194, 196 for respectively entering modifications to the frame classification descriptor attributes shown at field 192. As noted, in accordance with the invention, frame attributes may include classification descriptors, example pages, stop pages, and/or control parameters, which may be selectively combined to control the initial and subsequent queries for returning information elements; e.g., pages, for populating the selected frame in accordance with method 2 as will be described more fully below. Particularly, entry field 194 enables the user specify classification descriptor attributes to be included in the initial query, while entry field 196 enables the user to expressly exclude classification descriptor attributes not desired because of known lack of relevance to the subject frame. Additionally, partition 190 is seen to include a feature palette scroll box 198 having a predetermined lists of frame classification descriptors known to produce pages of authority for the features available from the feature palette scroll box. In accordance with method 2, where the user is uncertain what descriptors to include for the selected frame, he can make reference to the feature pallet. Still further, partition 190 includes entry controls 193, 195, 197 for enabling the user to identify and enter, respectively, example authorities, example hubs and stop pages above described. In preferred form, suitable example authority pages, hub pages and stop pages at lists 180, 182 of partition 178 may be highlighted, and, thereafter, designated for entry at controls 193, 195, 197, respectively. Further, as an alternate, or addition to controls 193, 195, 197 at partition 190, controls in the form of "buttons" well known in the art, but not shown for purposes of simplicity, may be placed in partition 178 related to the respective authorities and hubs listed, which a user could activate, for example, with a mouse pointer, to identify the associated authority or hub for inclusion as an example page.

Finally, screen 176 is also seen to include a partition 152 identical to that of 152 of screen 140 including respectively, designation of the display structure filename, menus, and mode buttons.

Figure 7:
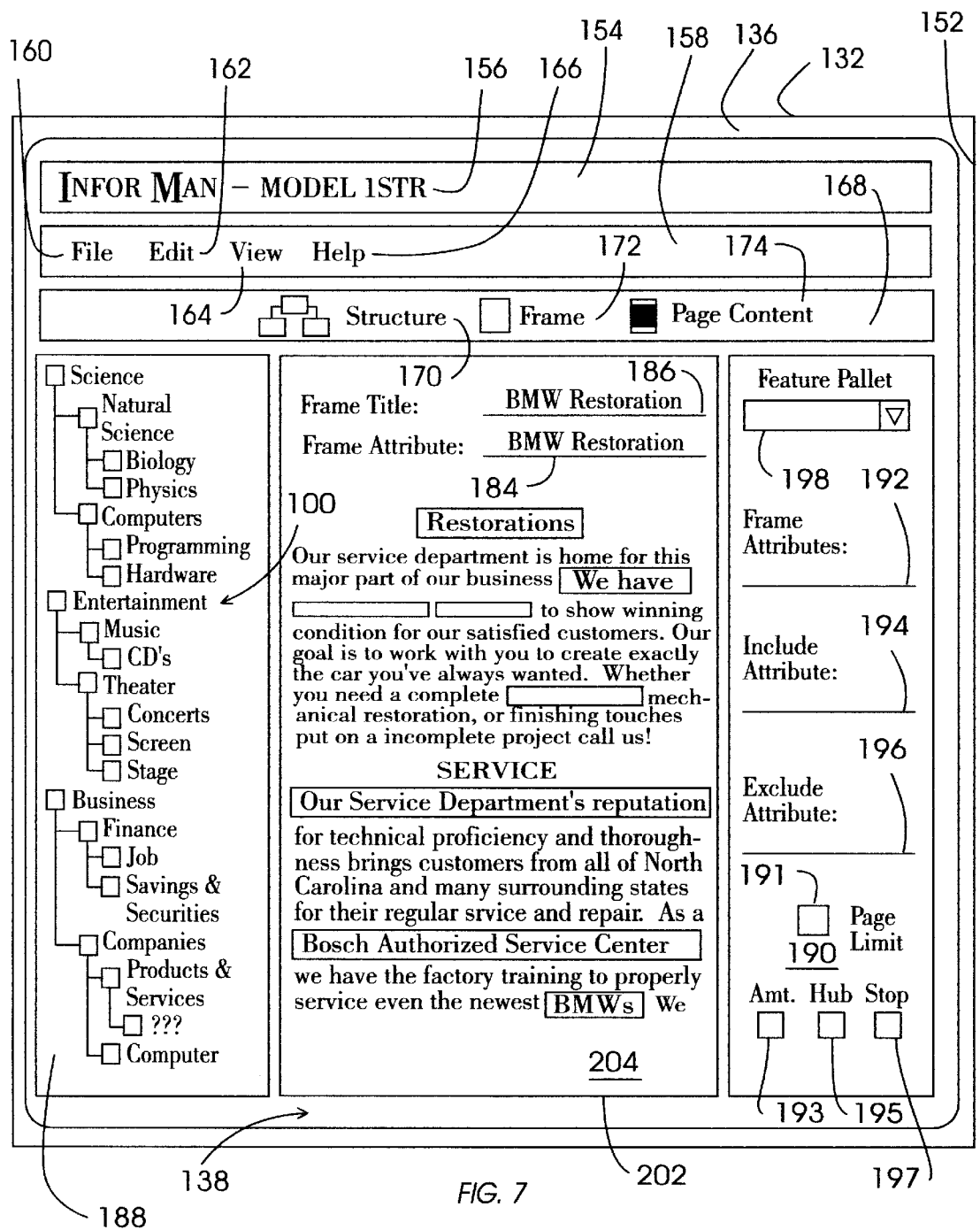
FIG. 7 is a schematic illustration of the display interface presented to a user for disclosing the content of a page included as a member of the page population for the information frame of a database hierarchical organizational structure in accordance with the method of the present invention.

Continuing with reference to FIG. 7, interface 138 in preferred form is seen to include a third screen 202, again having multiple partitions. In the case of interface screen 202, a partition 204 is provided for displaying the content of a document included at lists 180 or 182 of, respectively, authority or hub pages for a selected frame presented at partition 178 of interface screen 176. As will be appreciated, presentation of the content and links of an authority or hub page enables the user to quickly and easily monitor the effectiveness of the query and search process; i.e., frame attributes, and iteratively adjust the pages returned to populate the selected frame of structure 100.

To further assist in that process, in preferred form screen 202 also again includes editing partition 190 and structure display partition 188 shown at screen 176. Still further, screen 202 is also seen to include partition 152 shown at screen 176 and screen 140 which presents the filename for structure 100, drop-down menus and mode buttons.

Continuing with reference to FIG. 10, following display of the information structure; e.g. structure 100, method 2 includes step 220 for enabling the user to modify structure 100. As better seen in FIG. 11, method 2 includes step 222 for prompting the user to select a frame to modify. As will be appreciated, step 222 would be interactively conducted with the user at method interface 138. Specifically, method 2 includes program steps for successively presenting to the user interface screens at which the user can make judgments as to whether changes in structure 100 are required or desired.

Figure 11:
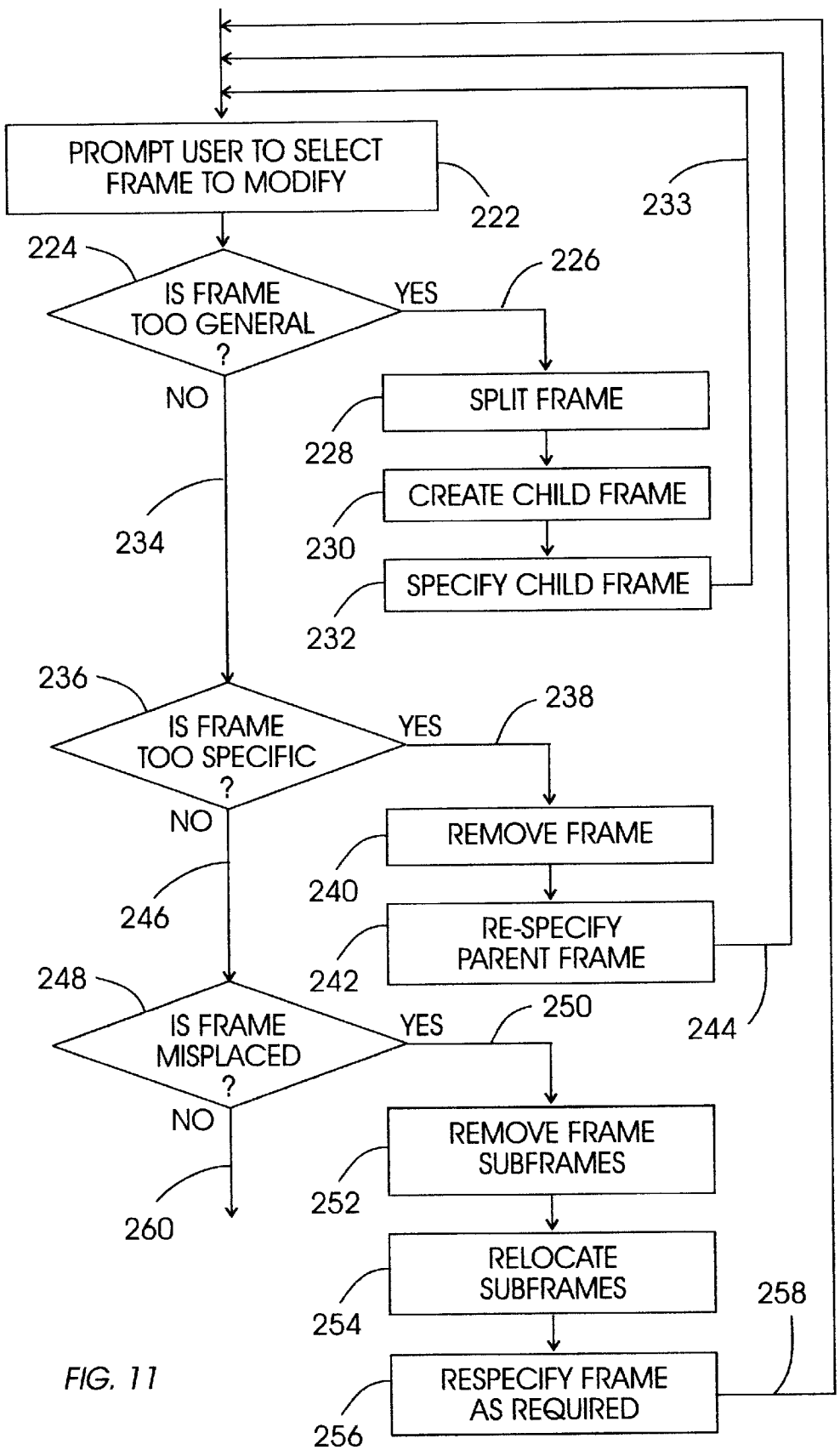
FIG. 11 is a flow diagram illustrating the more specific steps associated with the "Prompt User To Modify Frame Structure" step of FIG. 10, FIG. 10 itself illustrating the "Develop Classification Frame Hierarchy" general step in accordance with the invention illustrated in FIG. 9.

For example, once the user has selected a frame of structure 100 to modify at step 220, in accordance with the method, interface 138 provides displays; e.g., screens 140, 176 and 202, for enabling the user to make judgments as to whether frame modification would be warranted. Particularly, at step 224 following step 220 in FIG. 11, the user can make a judgment as to whether frame structure 100 is too general or not, based upon a review of the authorities and hubs presented at interface screen 176 and their content at screen 202; for example, where the frame existed prior to being worked, or during the course a subsequent population steps. As seen in FIG. 11 if the user finds a selected frame to be too general, method 2 proceeds over branch 226 to step 228 where the user is enabled to split the selected frame and add, at step 230, child frames having more specific frame attributes that would be designated at step 232. As would be appreciated, addition of a frame could be readily effected with use of interface 138 as described above.

Thereafter, method 2 program flow loops back over branch 233 to modification prompt step 222, where the user may again assess whether further modifications are necessary. For example, if after specifying addition of a frame at step 230, the user determines the frame specified at step 232 is too specific, the user would advance method 2 over branch 234 to step 236, where the user could then advance method 2 over branch 238 to step 240 where the user could readily delete a frame at interface 138 as above described, and re-specify a parent frame at step 242. And, again, method 2 would loop back to step 222 over method 2 branch 244.

Following return to step 222, the user could again determine if any further modifications of structure 100 were called for. For example, if the user neither found the selected frame too general nor too specific, method 2 advances over branch 246 to step 248 where the user could evaluate whether the selected frame is misplaced and required to be moved. If the user determines that the selected frame should be moved, method 2 advances over branch 250 to steps 252, 254 and 256 where the associated sub-frames could be removed and replaced in structure 100 as required at steps to 252, and 254 respectively, and the selected frame re-specified for its new location. Thereafter, method 2 loops back over branch 258 to step 222 to enable the user to again assess whether any further modifications to structure 100 are called for. If the user finds that no further modifications to the structure 100 are called for, method 2 exits the structure modification sequence at branch 260.

With reference to FIG. 9, following completion of structure development step 4, as noted, method 2 advances to step 6 where the user may select a frame he would like to populate with information pages. Following designation by the user of the frame he would like to populate, method 2 advances to step 8 where population of the selected frame is undertaken.

Before describing program flow for frame population with information elements; e.g. Web pages, a review of the underlying information elements retrieval process would be appropriate.

While methods previously known for computing relevance exploit the annotative power latent in hyperlinks, method 2 of the present invention seeks to determine what a link "i" says about its destination information element; e.g., page "j." To investigate this, method 2 defines a numerical affinity extending from link i to page j denoted $a_{ij}$. In general terms, method 2 features three steps.

1. Acquire a root set of entities to be analyzed, the root set being acquired by generating an initial set of Web pages with the use of a query derived from attributes of the category frame the user is interested in, frame attributes, as noted, selectively including frame classification designations, example pages, stop pages, and/or control parameters, as required, and which may exclusively include example pages. Subsequently, the initial set is supplemented and expanded based on whether example pages and/or stop pages were specified. Where example hubs were specified, preferably, any page pointed to by an example hub is used to supplement the initial set by including them with the initial set. Further, in the case where example authority pages were specified, the initial set is preferably supplemented by including any page that points to at least any two example authority pages. Additionally, to the extent that stop pages have been specified in the query, such stop pages are eliminated from the initial set. Thereafter, the supplemented initial set is expanded by including pages directly linked to pages of the supplemented initial set; i.e., pages that are either pointed to by pages of the supplemented initial set, or pages that point to pages of the supplemented initial set, which would include specified example hub pages and specified example authority pages. Finally, the specified stop pages would again be eliminated from the expanded, supplemented initial set; i.e., root set, to cover the possibility of stop pages having been drawn in during the expansion process.

2. Approximately generate one or more eigenvectors of two similarity matrices, described below, by means of iterative updating, as also described below.

3. Analyze the resulting eigenvectors to facilitate ranking and/or partitioning of the set of entities.

In the case where relevant sources are to be identified, step 2 above described proceeds as follows.

Let "S" be the root set and "E" be the set of links, between pages in the root set. Further, let m=|E|, where m refers to links i; and n=|S|, where n refers to pages j. Additionally, let "A" be an m x n matrix representing the weight of each link in connection with hub calculations, and "B" be an n x m matrix representing the weight of each link, in connection with authority calculations, and where the contents of A and B are as defined below. Still further, let a be an n vector representing the authority value of each of the n pages. Additionally, let h be an m vector representing the hub value of each of the m links. With the above in mind, each round of iteration comprises the following three steps:

1. Update authority scores: a←Bh;
2. Update hub scores: h←Aa; and
3. Re-pack; i.e., re-compute authority; i.e., a.

This process is repeated for as long as necessary to achieve the desired result. In preferred form, five such steps have been found sufficient.

While the contents of A and B may include contribution from a number of factors affecting link weight, in preferred form, method 2 includes contributions from such factors as: textual content; self-promotion; spreading functions; example pages; and copied pages.

Particularly, and with regard to the contents of matrix B=$[b_{ji}]$, $b_{ji}$ is the weight of link i, which points to page j. Initially, $b_{ji}$ is set to 1, the default hub link weight, if link i points to page j, and is 0 otherwise. Thereafter, hub link weight $b_{ji}$ is increased if the link can be considered to have additional relevance due to one or more of such factors as: being located in a page close to a search term; referred to as "context relevance", context relevance being additive for each occurrence of required proximity to a search term; or being copied multiple time; i.e., termed "replication relevance"; or being illustrative of a preferred link; termed "example relevance." Further, in accordance with method 2, in the case where multiple relevance enhancing factors are present, the weight of the link is successively increased either additively or multiplicatively by each factor as described below.

More specifically, in the case of context relevance, for each query term that occurs within W words of link i, $b_{ji}$; i.e., link weight, is increased in value by an amount equal to (W−d). In this context, d is the distance from the anchor text of link i to the nearest occurrence of the query term, and may have the value 0. In preferred form, W is set to 10. Further, before the described context relevance value; i.e., W−d, is added to the link weight, it is first multiplied by the factor 1.2 if the query term begins with a "+" sign; and by −0.2 if the query term begins with a "−" sign, the "+" and "−" signs being understood in conventional search fashion; and by 0 if the query term is separated from the link i by an HTML heading or horizontal line. Moreover, and as noted, such an addition would be included for each instance of context relevance.

Subsequently, and yet further, where copied pages are found; i.e., where replication relevance is present, and all but one deemed the original is eliminated, to reflect the significance of the page having been copied, the weight of the links for the retained page, as described above, are increased by a factor equal to the log of the number of copies. Further, this replication relevance is applied as a multiplication factor to the link weight as enhanced by any other relevance factor.

Still further, and thereafter, where example pages are used, because of the importance of respective example pages, the weight of the links within an example page are likewise increased based on example relevance thereby deemed present. Particularly, the weights of all links within example hub pages are increased by a multiplication factor of 1.1. In the case of example authority pages, the weight of links within the page are increased by first identifying a page region as defined by the occurrence of a page and/or section heading, and/or ruled page line; page and section headings and ruled lines being defined in conventional HTML fashion. Subsequently, within the identified region, a window of 25 links forward and 25 links backward in the page from the subject link is placed about a subject link. Thereafter, if there is one example authority link within the window, a multiplication factor of 1.1 is applied to the weight of the subject link. Further, if there are two or more example authority links within the window, a multiplication factor of 1.5 is applied to the weight of the subject link. However, if no example authority links are present within the window, no multiplication factor is applied to the weight of the subject link.

With regard to matrix A, in accordance with method 2, matrix A is defined to be $B^T$, wherein the B matrix is as previously defined, but is modified to take into account the spreading of authority weight around neighboring links.

Particularly, consider two links, i and i', then, let s (i, i')=g(|i−i'|) if i, i' are neighbors, and s(i, i')=0 if i, i' are otherwise. Links i and i' are "neighbors" if there is no page boundary, HTML heading or horizontal line separating them. In this regard, g(n) is a truncated, Gaussian function well known in the art. Further, in preferred form, the following values are provided, g(0)=1; g(1)=0.5; g(2)=0.1; g(3)=0.01; and g(n>3)=0.

Under the noted considerations, A=$[a_{ij}]$, where $a_{ij}=\Sigma b_{ji'}$ s(i, i'), the summation being taken over i' ∈E, such that i' points to j. It is to be understood i refers to a link and j refers to a page and $a_{ij}$ is the weight of link i that points to page j.

Finally, re-packing authority step 3 above noted for each round of iteration is performed by zeroing the authority of all but the highest authority page of each Web site.

After the requisite set of iterations are complete, the hub scores of a page p is set to the sum over all links i on the page h[i].

In accordance with method 2 the basic computational procedure is modified in several ways in order to remove other spurious effects that adversely affect the noted computation.

Particularly, to avoid "self-promotion"; i.e., accumulation of spurious authority conferred on pages by pages of the same Web site, in accordance with method 2, pages are filtered so as to discard links from pages on a Web site to pages on the same Web site. In accordance with method 2, affinity between entities on the same Web site is thus reduced, a Web site being understood to potentially encompass either a part of, or all of a host, or several hosts. Two pages are defined as being on the same Web site if they satisfy the following test: for class A and class B IP addresses, two pages are considered to be on the same Web site if the two most significant octets of their respective addresses match; for class C addresses, two pages are considered to be on the same Web site if the three most significant octets of their respective addresses match; and for class D addresses, two pages are considered to be on the same Web site if all four octets of their respective addresses match.

Regarding "redundant hubs," the value of a hub page is, by definition, in its links rather than its contents, i.e., "better" hubs are hubs having greater numbers of links to quality authority pages, quality, as noted, being assessed based on the authority scores found for an authority vector during computation, and the hub scores for a hub vector during computation. Accordingly, if all the destinations accessible from a particular hub are also accessible from "better" hubs; i.e., hubs of greater relevance, that particular hub need not be outputted. More generally, the method seeks to return a set of hub pages that together contain as many, unique, high-quality links as possible. The method, therefore, filters the pages by applying a well-known "greedy test" as follows: once the iteration step has converged, the method identifies the best hub; zeros the authority values of all pages pointed to by that hub; re-computes hub values; and thereafter, continues outputting the next best hub, zeroing authority values of pages it points to, and so forth.

With respect to "related-page" factors, it has been found that despite application of the "self-promotion" removal procedures noted, it is possible, for instance, for a home page of a Web site, and several children of that page to accumulate authority. However in the final output the method seeks to provide the user as much authoritative substance as possible in as small a number of pages as possible. To achieve this, method 2 applies step 3 described above, i.e., re-compute authority; i.e., a.

Continuing, spurious results have also been found to be introduced into relevance computations by the now common practice of Web site providers including in their sites material copied from other Web sites. Because of the economic and creative pressures on Web site providers to produce "content", providers often copy page or page parts from others rather than generate new and original material for their sites. Existence of multiple copies of hub and/or authority pages, however, adversely affects relevance computations. For example, multiple copies of hub pages erroneously increase the authority weight of pages pointed to, the same material being pointed to each time a hub is copied.

Likewise, multiple copies of authority pages also produce problems. Particularly, copies of the same authority page split; i.e. divide, the number of links pointing to the same subject matter; i.e., the hubs links pointing to the authority subject matter are dispersed over the copies. As will be appreciated, if there was only one copy of the authority, all hubs links for the authority would point to that one copy, thereby, consolidating the effect of the links. However, if the hub links rather point to different ones of the multiple authority copies, the total number of links that would otherwise be available is dissipated over the multiple copies. Accordingly, and as is apparent, the occurrence of "copied pages" adversely affects accuracy of the relevance computation.

Method 2 in preferred form also features steps for diminishing the adverse effect on relevance computation caused by copied pages. Specifically, method 2 features steps prior to computation of relevance for determining whether two or more pages can be considered copies of one another with the use of a "similarity" checking procedure, canceling all but one of the pages, the retained page being deemed the original, redirecting the links to the copies found to the page deemed the original, and increasing the weight of the links from the page deemed the original by using a multiplication factor applied to link weight representing the significance of the multiple copies of the original page having been made. Particularly, in preferred form, the similarity check is undertaken with the Shingles algorithm developed by DEC SRC, an affiliate of the Compaq Computer Corporation. Further, the multiplication factor used to increase link weight for links of copied pages is made equal to the log of the number of copies found of the page.

Finally, with regard to "false authority", it has been found that many resource compilations such as bookmark files contain pages pertaining to a number of disjoint topics. This causes such compilations to falsely become good hubs, which in turn cause irrelevant links from the same page to falsely become good authorities. To address this problem, method 2 notes that pointers to pages on the same topic tend to be clustered together in resource compilations. Method 2, therefore, filters the pages by allowing each link in a Web page to have its own hub value so the hub value of the page becomes a function of the particular link rather than a constant. When computing authority values, the authority of the destination is incremented by the hub value of the link. When computing hub values, the authority value of the destination is used to increment the hub value of the source link and according to a spreading function, the hub values of neighboring links. Thus, useful regions of a large hub page can be identified and the effects of irrelevant portions of the page diminished. The final hub value of a page is the sum of all the hub values of its links.

Method 2, applies the filtering procedures so as to be consistent with the described matrix computational framework and to enable an acceptable degree of convergence. Particularly, the "self-promotion" and "redundant hub" filtering procedures are arranged, respectively, as "pre" and "post" processing steps, and the "false authority" filtering procedures are arranged as a linear transformation that may be expressed as a matrix multiplication.

Continuing, in the above discussion, "actual" links that expressly connect a first page with a potentially relevant second page are presumed. However, in accordance with the invention, method 2 would also apply to "virtual" links; i.e., links that may be inferred based on similarity between pages not expressly linked. In the case of a virtual link, all that it is required is to adjust the affinity indices, "$a_{ij}$", "$b_{ji}$" where "j" indicates the destination page and "i" indicates the virtual link to represent the relationship between the pages considered virtually linked. Once that has been done, the computation proceeds as described for actual links.

For example, in accordance with the invention, it has been found that pages can be virtually linked based on the number of commonly occurring terms between them, relative to the number of terms in the reference page. Specifically, a virtual link i may be inferred where a page j which includes n terms common to a page j' having t total terms. For this virtual link, the affinity index $a_{ij}$ would be set equal to the number of terms in page j that are common to the terms in page j', divided by the total number of terms in page j', the virtual link having the direction of the reference page j' to page j having the common terms. As will be appreciated, in addition to the functional relationship for $a_{ij}$ described, other linguistic approaches applying natural language processing techniques could also be used to provide understanding of the document content and to, thereby, develop virtual links.

Figure 12:
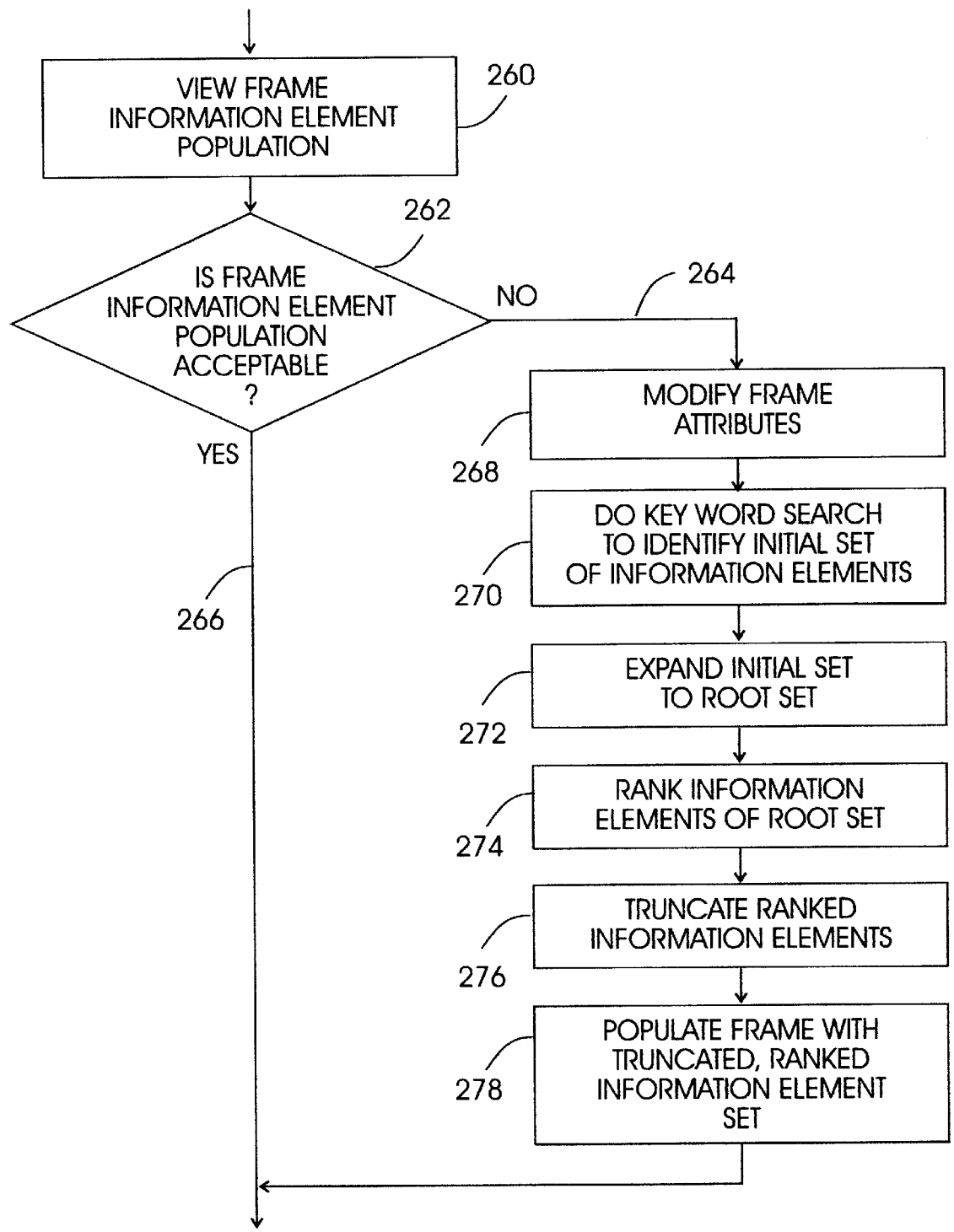
FIG. 12 is a flow diagram illustrating the more specific steps associated with the "Populate Selected Frame With Information Elements" general step of the method in accordance with the present invention illustrated FIG. 9.

Returning to the description of program flow for method 2 and, particularly, population of a selected frame of the information organization structure with information elements; e.g., Web pages, attention is directed to FIG. 12, in which frame population step 8 of the general method description presented in FIG. 9, is shown in greater detail. Once again, and as noted above, for simplicity, the more specific term "Web page(s)" or "page(s)" will be used in the following discussion, it being understood, however, that the more general term "information element(s)" is to be understood. Further and as noted above, the reference to Web pages includes a part of page, a whole page or combination of pages but functions as the unit of reference. As seen in FIG. 12, following selection of a frame to be populated at interface 138, method 2, at step 260 calls for the page population of the selected frame to be viewed by the user to assess whether the population is acceptable, or whether further searching and populating is desired. In accordance with method 2, and in preferred form, the user undertakes viewing of the selected frame page population at partition 178 of interface screen 176 described above and shown in FIG. 6.

As seen in FIG. 6, specifically, at interface partition 178, in the case where the frame selected had been previously populated; e.g., the frame of a pre-existing information organizational structure, or a frame that had been previously populated, as where a search had been previously conducted, the user is presented with authority list 180 and hub list 182, including the, respective, authority and hub pages for the frame collected with the use of prior searches and associated queries. More specifically, in preferred form, method 2 includes steps for presenting at list 180 and 182, the titles of the pages previously collected ranked by authority weight and hub weight, respectively.

As will be appreciated, this presentation of collected pages ranked by respective authority and hub weights enables the user to quickly assess whether the population of the frame is acceptable. Further, this form of presentation is rendered yet more effective in aiding the user's evaluation when combined with the ability of method 2 to provide distilled lists of only the highest weight authority and hub pages, respectively.

And, as described above, to additionally aid the user's evaluation, method 2 includes program steps which enable the user to randomly select any authority page or hub page, and view its content and links at screen partition 204 shown in FIG. 7. As is apparent, the ability of method 2 in preferred form to enable the user to view and analyze page content, query terms and links quickly and easily yet further assists the user's evaluation of the selected frame's page population. Particularly based on such presentation, the user is able to identify authority pages and hub pages suitable for use as example pages in the fashion described above to bias iteration of page identification in a desired direction Likewise, in a comparable fashion, the user may also identify pages tending to bias identification in undesired directions which can thereafter be used as stop pages to suppress such effects.

Though for sake of simplicity not shown in FIG. 6, method 2 in preferred form also presents summary information concerning total pages of the population, associated weight ranges and other search-result information to aid the users evaluation at interface screen partition 178. As will be appreciated by those skilled in the art, such information may be readily obtained from the computation results described and presented in conventional fashion at partition 178.

Continuing, though the description of step 260 shown in FIG. 12 has been given for the case where the selected frame includes a pre-existing page population, it should be understood, comparable steps would apply in the case where the frame had been newly designated, and no prior search conducted. In case of a newly designated, unsearched frame, no page population, of course, would yet be available for the user to review. However, as will be described below, other components of interface 138, such as display of the title for the selected frame at partition region 186 and the frame attributes at region 184, along with editing partition 190 and organizational structure partition 188 would be available to the user. In this regard, in accordance with method 2, it should be understood that example pages could exclusively be entered as query terms.

Continuing with reference to FIG. 12, once the user has viewed and fully analyzed the page population for the selected frame at step 260, program flow advances to step 262 at which method 2 enables the user to indicate whether the population is acceptable. In the case where the population is acceptable, and the user so indicates, program flow advances over branch 266 and exits step 8, as best seen in FIG. 9, to proceed to step 10 where method 2 enables the user to select another frame and associated population for review.

On the other hand, and with reference again to FIG. 12, in the case where the user at step 262 finds the page population for the selected frame to be unacceptable, and so indicates, method 2 program flow advances over branch 264 to step 268 where the user can modify the selected frame's attributes in order to generate a new search query and retrieve a new collection of pages. In accordance with method 2, to facilitate correlation of the selected frame page population with the frame description, method 2 includes steps for enabling the attributes of the frame to be employed as the query terms for the search.

In this regard, and as noted above, frame attributes may also include, and, indeed, exclusively include identification of example hub pages and authority pages, the identities of which may be made part of a query to bias the relevance computation in desired directions. Additionally, and as noted, query terms may also include stop pages, i.e., identification of pages for avoidance which found to bias the relevance computation in undesired directions, as well as parameters helpful for retrieving the initial set, such as control parameters helpful for managing the extent and amount of CPU, memory and storage resources used during searching, as are well known in the art.

Accordingly, in the case where a pre-existing population is available at the selected frame, all the user need do to adjust the frame page population, is to adjust the frame descriptors, i.e., frame attributes, to, thereby, generate new query terms which, in turn, will be employed by method 2 to automatically retrieve a new set of pages to populate the frame. In the case where the frame is newly designated, and no acceptable population yet exists, the user would employ the descriptors; i.e., attributes, for the frame to enable method 2 to automatically retrieve a beginning population.

In preferred form, method 2 includes steps for permitting the user to easily and conveniently adjust the attributes for the selected frame. Particularly, method 2 includes steps for enabling display interface 138 to present the attributes for the selected frame so they can be readily adjusted. As shown in FIGS. 6 and 7, screens 176 and 202 include editing partition 190 having the same elements, 192 to 198, for enabling the user to conveniently modify frame attributes and accordingly, the search query terms. Specifically, editing partition 190 at screens 176 and 202, include display field 192 for presenting the current form of the frame attributes, and entry field 194 for enabling the user to add frame attributes; i.e., descriptors, to the current form of the frame attributes to further refine the search query. Additionally, editing partition 190 is seen to include entry field 196 for enabling the user to expressly excluded attributes which the user believes would not be helpful; i.e., not relevant.

As well, editing partition 190 is also seen to include feature palette 198 in the form of a pull-down menu, which, as described above includes a listing of predefined frame attribute features. More specifically, in preferred form, method 2 includes steps for associating the feature palette menu items with look-up tables or libraries of frame attributes; i.e., search query terms, known to produce pages of high quality; i.e., authority, for the respective attributes listed in the menu.

Still further, and as seen in FIGS. 6, 7, method 2 in preferred form also includes steps for enabling attribute editing partition 190 to also include entry field 191 for permitting the user to specify the number of pages to be retrieved. For example, if the user wishes to retrieve only five or six of the highest authority pages found in a search, or for that matter, only the highest authority page, he can do so with an appropriate entry at field 191. As well, method 2 also includes steps for enabling partition 190 to include controls 193, 195, 197, for permitting the user to specify, respectively, example authority and hub pages and at field 197 to specify specific pages to be excluded as described above. In this regard, and as noted, control button means, not shown, located at interface partition 178 associated with the lists of authorities and hubs could additionally or alternatively be used as well.

Figure 13:
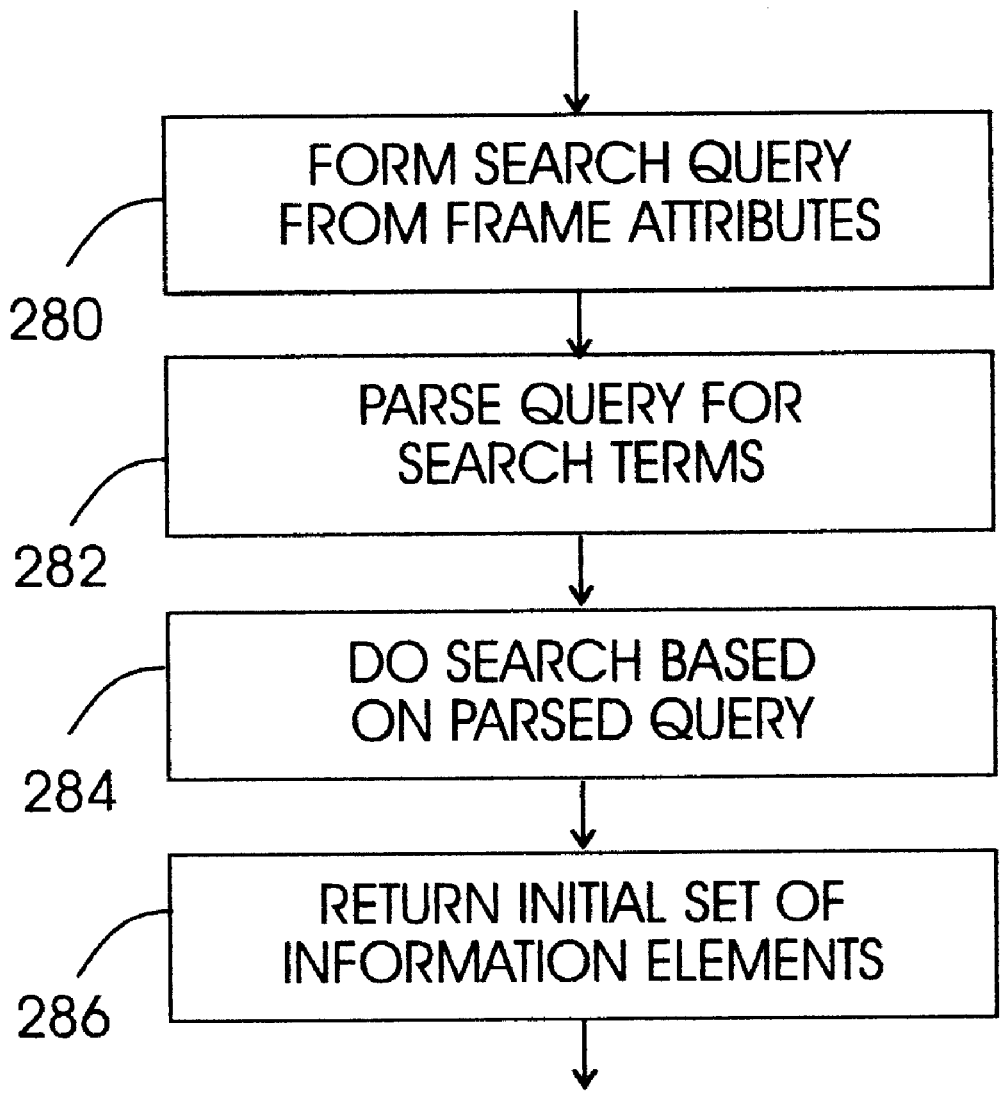
FIG. 13 is a flow diagram illustrating the more specific steps associated with the "Do Key Word Search To Identifying Initial Set Of Information Elements" step of FIG. 12, FIG. 12 itself illustrating the "Populate Selected Frame With Information Elements" general step of the method in accordance with the present invention illustrated in FIG. 9.

Continuing with reference to FIG. 12, following step 268, program flow advances to step 270, at which method 2 includes steps for automatically composing a query for initiating a search based on the frame attributes identified by the user, frame attributes as noted potentially including classification descriptors, example pages, stop pages and/or control parameters as selectively combined by the user, and retrieving an initial set of information pages. More specifically, and as shown in FIG. 13, method general step 270, in preferred form, first includes the more specific step 280 of forming a search query based upon the frame attributes the user has entered at editing partition 190, either at screen 176 or 202. Thereafter, method 2 includes step 282, for parsing the query generated at step 280 to produce, in conventional fashion well known in the art, a series of search terms, and to, subsequently, at step 284 undertake a search of the World Wide Web based on the parsed query, again in conventional fashion; e.g., using query syntax, common to Web search engines. Finally, following the search, method 2 returns an initial set of information pages at step 286.

Continuing with reference to FIG. 12, once method 2 identifies and returns the initial set of pages based on the frame attributes which the user entered at step 270, program flow advances to step 272, at which method 2 includes steps for automatically expanding the initial set to form a "root set" of pages. To accomplish this, method 2 includes a sequence of more specific procedures better seen in FIG. 14.

Particularly, following return of the initial set of pages responsive to the query, the initial set is supplemented based on whether example pages and/or stop pages were specified. Particularly, in the case where example hubs were specified, preferably, any page pointed to by an example hub is used to supplement the initial set; i.e., brought into the initial set. Further, in the case where example authority pages were specified, the initial set is preferably supplemented by including any page that points to at least any two example authority pages. Additionally, to the extent that stop pages have been specified in the query, such stop pages are eliminated from the initial set. Further, once the initial set is supplemented as described, the supplemented initial set is then expanded by including pages directly linked to pages of the supplemented initial set; i.e., pages that are either pointed to by pages of the supplemented initial set, or pages that point to pages of the supplemented initial set, which, as will be appreciated, would include specified example hub pages and specified example authority pages. Finally, the specified stop pages would again be eliminated from the expanded, supplemented initial set; i.e., root set, to cover the possibility of stop pages having been drawn in during the expansion process.

In this regard, the method thus includes steps for generating an initial set of pages based upon frame attributes as described, and then through an iterative process of issuing queries and following links into and out of already fetched pages, the iteration is carried out until as described the initial set is supplemented and expanded to form the "root set" upon which later computation can be performed.

Figure 14:
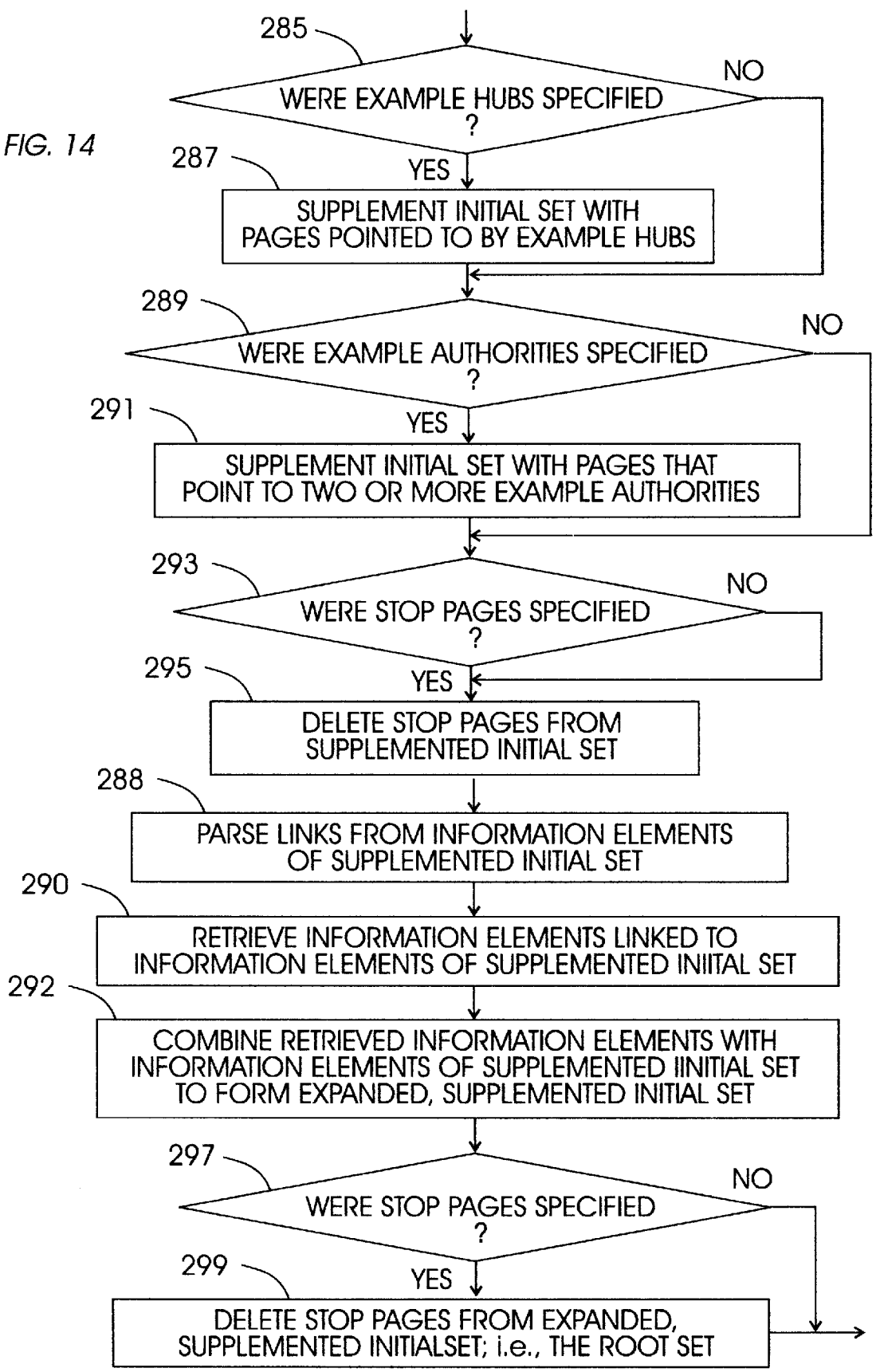
FIG. 14 is a flow diagram illustrating the more specific steps associated with the "Expand Initial Set To Root Set" step of FIG. 12, FIG. 12 itself illustrating the "Populate Selected Frame With Information Elements" general step of the method in accordance with the present invention illustrated in FIG. 9.

As seen in FIG. 14, general expansion step 272 shown in FIG. 12, first includes step 285 for controlling program flow depending upon whether or not example hubs were specified in the query giving rise to the initial set. In the case where no example hubs were specified, method 2 proceeds to step 289. However, in the case where example hubs were specified, the initial set is supplemented with pages pointed to by the example hubs. Thereafter, method 2 progresses to step 289. At step 289 method 2 determines whether or not example authorities were specified. If no example authorities were specified, program flow continues to step 293. However in the case where example authorities were specified in the query, where pages are found that point to two or more of the example authorities, such pages are also added to supplement the initial set. Thereafter, in accordance with method 2 processing proceeds to step 293 where program flow is directed depending upon whether stop pages were specified in the query. In the case where no stop pages were specified in the query, program flow advances to step 288. However, if stop pages were specified, program flow in accordance with method 2 advances to step 295, at which the initial set is supplemented by deleting any specified stop pages. Thereafter, method 2 progresses to step 288.

At step 288, method 2 includes steps for parsing; i.e. extracting, from the initial set of pages the links to other Web pages potentially relevant to the original query formed from the frame attributes the user entered. In accordance with the invention, method 2 includes steps which seek to identify the links available in the supplemented initially returned pages on the understanding and belief that those links include intelligence, originally planned into the pages by the page creators, which intelligence is likely to identify other pages of potentially greater authority concerning the search terms included in the initial query.

As will be appreciated, and as is known in the art, when Web page creators craft pages, they typically include "links" to other pages available on the Web which either support, authenticate or otherwise relate to the subject matter included in their own pages. Accordingly, by identifying those links, method 2 of the present invention seeks to build on the assets in the form of links, provided by former page creators, as method 2 seeks to identify the higher levels of authority concerning the subject matter of interest.

As noted above, links include, and, thereby, identify two types of pages which define the link relationship. The first, the page that originates the link, termed a "hub"; i.e. the page that points to another page of presumed potentially greater relevance on the subject matter, and the second, the page that receives the link termed the "authority." In accordance with method 2, though it is understood that not all links will necessarily point to pages of higher authority on the subject matter of interest, it is recognized that such links constitute a starting point from which pages of higher authority may be identified upon application of a proper sequence of refining steps in accordance with method 2.

Figure 8:
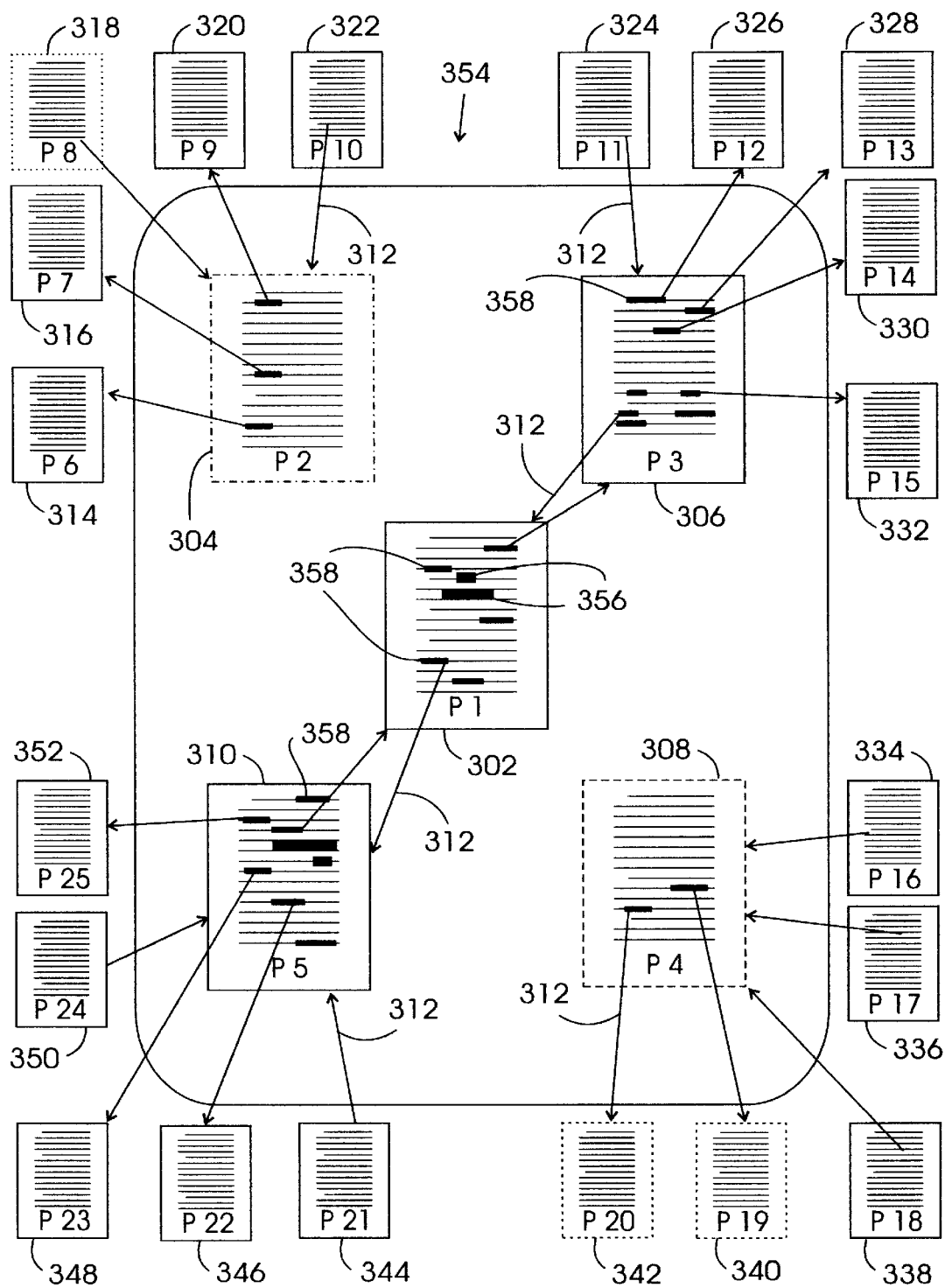
FIG. 8 is a diagram illustrating a root set of pages expanded from an initial set of pages returned in response to a query based upon the attributes of a frame proposed to be added to a database hierarchical organizational structure in accordance with the method of the present invention.

This relationship, and the procedures for supplementing and expanding the initial set may better be understood with reference to FIG. 8. In FIG. 8, the initial page set retrieved is designated 300, and shown to include pages 302, 306 and 310 coupled by links, represented as arrows, commonly designated 312. Additionally, initial set 300 is also seen to include, and be supplemented by pages 304 and 308 shown with interrupted outlines to indicate they pages 304, 308 are not within the initial set immediately following return of the initial set. More specifically, page 304 is seen to be a page pointed to by an example hub represented by page 318, denoted P 8, page 304 having been added to supplement the initial set in accordance with method 2 as described. Further, page 308 is seen to be pointing to, two example authority pages 340, 342, respectively designated P 19 and P 20, thus, again having been added to supplement the initial set in accordance with method 2 as described. Still further, though for simplicity, stop pages have not been shown, it is to be understood that in the case where stop pages are specified, in accordance with method 2, they would have been removed from the initial set as the initial set is supplemented.

Continuing, FIG. 8 is also seen to include a group of extended pages 314 to 352 located not more than one link away from the pages of the supplemented initial set, the links, again, shown as arrows, commonly designated 312. As will be appreciated, initial pages 302, 306, and 310, supplemented with page 304 based on example hub 318 pointing to page 304, and page 308 based page 308 pointing to at least two authority pages 340, 342, as combined with extended pages 314 to 352 constitute the expanded; i.e., root, set of pages designated 354. As shown in FIG. 8, pages 302, 306 and 310 of the initial set each include highlighted blocks generally designated 356 representing occurrences of one or more of the search query terms, referred to in the art as a "hits", and highlighted blocks generally designated 358 indicating sources for links 312. In this depiction, "hub" pages would be those at which a link arrow tail is located and "authority" pages those at which a link arrow head is placed.

Upon contemplation of FIG. 8, the logic underlying use of an initial search to aid in identifying pages of higher authority becomes clear. Given the observation that links represent intelligence in the pages identifying potential sources of authority concerning page subject matter, if pages having relevance to the initial query are first identified with search "hits" in conventional fashion, links associated with those hits are likely to identify potential sources of authority concerning page subject matter. That being the case, once the potential sources of authority; i.e., links, are identified, it remains to, thereafter, optimize their potential identification of subject matter authority, and to subsequently filter spurious effects arising during the optimization process.

However, while this approach at first blush may seem straightforward, it has been found necessary, as noted, above to identify the multiple sources of spurious effects which introduced error into the optimization computation, and to develop procedures and combinations of procedures for their removal. And, those identifications and developments have by no means been immediately apparent.

Moreover, it is likewise not immediately apparent how effective the use of example pages and stop pages can be in directing return of high relevance pages.

Returning to FIG. 14, following the parsing of links from the pages of the supplemented initial set at step 288, method 2, thereafter, includes step 290 for retrieving pages linked in the fashion depicted in FIG. 8 to pages of the supplemented initial set. In preferred form, the procedures comprising step 290 include employing a "crawler" or comparable means, well known in the art, for investigating the Web and retrieving pages linked to pages of the initial set. Additionally, method 2 in preferred form also includes steps for using preestablished reference libraries which identify sources of authority associated with the links identified in the initial set.

In this regard, in preferred form, in order to find pages that linked to a particular page, method 2 employs search engines that provide "inlink queries ", known in the art, to facilitate recovery. Additionally and in preferred form, method 2 may also maintain an index engine for providing inlinks and key word queries locally; i.e., in connection with the described identification process.

Once method 2 automatically retrieves the pages for the expanded set, the expanded pages are combined with the pages of the supplemented initial set at step 292 shown in FIG. 14. Continuing, upon completion of step 292, method 2 proceeds to step 297 where stop pages, if identified in the query are again checked for deletion at step 299 in the event they are brought in during expansion of the supplemented, initial set.

Continuing, upon completion of step 299 shown in FIG. 14, general step 272 in FIG. 12, for expanding the initial set into the root set is concluded, and method 2 advances to step 274 for automatically ranking the pages in terms of authority. As with step 272, step 274 shown in FIG. 12 is general in character and actually comprises a number of more specific steps introduced in FIG. 15. With reference to FIG. 15, general step 274 is seen to comprise first, more specific step 360 for filtering the root set.

As pointed out above, sources of spurious effects adversely affect computation of page ranking; i.e. authority determination. Moreover, in accordance with the invention, it has been found advantageous to suppress sources of spurious effects in a particular sequence, which sequence is dependent upon the nature of the spurious effect sought to be eliminated. Particularly, due to its character, "self-promotion" has been determined to be a source of a spurious effect which is advantageous to eliminate at the outset of computation. As explained, self-promotion arises from links between pages of the same Web site. Specifically, pages of the same Web site have been discovered to artificially conferring authority on each other. As will be appreciated, method 2 is interested in links which it is believed a Web-page creator undertook to independently identify and include. As a result, where pages are believed identified based on some bias; e.g., coming from the same source, they may not meet the noted criteria, and accordingly, should be avoided.

To overcome this problem method 2, includes filtering procedures at step 360 shown in FIG. 15. Particularly, it has been found that self-promotion effects can be reduced if links between pages of the same site are disregarded. And, still further, it has been found effective in implementing this procedure to define pages as being of the same site based on the nature of the site address. Specifically, in accordance with method 2, pages are defined as being from the same Web site if they satisfy the following test: for class A and class B IP addresses, two pages are considered to be on the same Web site if the two most significant octets of their respective addresses match; for class C addresses, two pages are considered to be on the same Web site if the three most significant octets of their respective addresses match; and for class D addresses, two pages are considered to be on the same Web site if all four octets of their respective addresses match.

Following procedures for reduction of self-promotion factors at step 360, method 2, as shown in FIG. 15, advances to step 362 for generating page relevance weights. As in the case of the steps shown in FIG. 12, step 362 seen in FIG. 15 is itself, general in character and, in accordance with method 2, includes a series of more specific steps. Particularly, and as shown in FIG. 16, step 362 for generating page relevance weights, first includes step 366 for generating a collection of nodes linked together by edges as described above.

Thereafter, at step 368 shown in FIG. 16, the authority weights and hub weights for respective pages are initially calculated in accordance with the relationship above described.

Particularly: where "S" is the root set and "E" the set of edges; i.e., hyperlinks, between pages in the root set, then, if m=|E|, where m refers to links i, and n=|S|, where n refers to pages j, and "A" is an m×n matrix representing the weight of each link in connection with hub calculations, and "B" is an n x m matrix representing the weight of each edge in connection with authority calculations, the weight computation can proceed if a is an n vector representing the authority value of each of the n pages and h is an m vector representing the hub value of each of the m hyperlinks. With the above in mind, each round of iteration comprises the following three steps:

1. Update authority scores: a←Bh;
2. Update hub scores: h←Aa; and
3. Re-pack; i.e., re-compute authority; i.e., a.

This process is repeated for as long as necessary to achieve the desired result. In preferred form, five such steps have been found sufficient.

Thereafter, as shown in FIG. 16, the method 2 advances to step 370 where in accordance with the invention, the weight computations are modified to include amplification factors, as previously described, to note potential relevance of a link to the original in the computation, as for example, "context relevance", "replication relevance" and "example relevance" as described above.

Following computation of the modified page weights at step 370, method 2, as shown in FIG. 16, advances to step 372 where the modified weights may be suitably filtered as required to reduce spurious factors.

Continuing, upon completion of step 372 shown in FIG. 16 method 2, concludes step 362 shown in FIG. 15, and advances to step 364 for iteratively determining page authority and hub scores.

Figure 17:
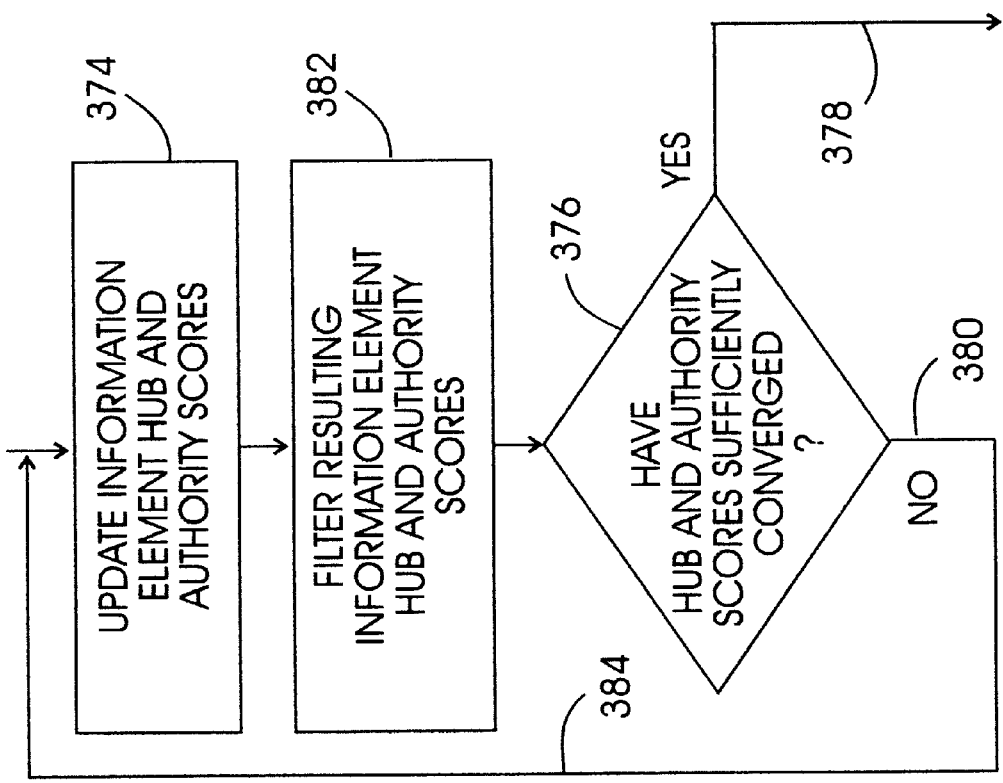
FIG. 17 is a flow diagram illustrating the more specific steps associated with the "Determine Information Element Authority And Hub Scores" of FIG. 15, FIG. 15 itself illustrating the "Rank Information Elements Of Root Set of FIG. 12, FIG. 12 itself illustrating the "Populate Selected Frame With Information Elements" general step of the method in accordance with the present invention illustrated in FIG. 9.

As with other steps, step 364 shown in FIG. 15 is general in character, and is actually comprised of more specific steps better seen with reference to FIG. 17. As seen in FIG. 17, general step 364 for iteratively determining page authority and hub scores first includes step 374 for updating hub and authority scores. As will be described, this "updating" step includes both score recalculation and "false-authority" suppression procedures.

As described above, resource compilations such as bookmark files, commonly contain pages pertaining to a number of unrelated topics. Further, it has been found that because of this, such compilations tend to falsely become good hubs, which in turn causes irrelevant links from the same page to falsely become good authorities, this problem being referred to as "false-authority." To address this problem, it has been determined effective in reducing such false-authority effects in accordance with method 2, to provide remedial procedures at this point in the computation; i.e., during iterative determination of hub and authority scores.

Particularly, to reduce false-authority effects, method 2 includes procedures for allowing each link in a page to have its own hub value so that the hub value of the page can become a function of the particular link rather than a constant. Further method 2 includes procedures when computing authority values, for incrementing the authority of a page with the hub value of the link which points to it. And, when computing hub values, method 2 includes procedures for using the authority value of the page pointed to, to increment the hub value of the link which points; i.e., acts as a hub, and according to a spreading function, the hub values of neighboring links. As a result of this, method 2 is able to identify useful regions of a large hub page, and diminish the effects of irrelevant portions of the page. As will be appreciated, the final hub value of a page is the sum all the hub values of its links as described in detail above.

Continuing with reference to step 374, as will be appreciated, the procedures for diminishing related-page effects, as described above, require that they be carried out during a recalculation of hub and authority scores. Accordingly, step 374 in accordance with method 2 integrates both procedures for diminishing related-page effects and recalculation of page hub and authority scores.

As shown in FIG. 17, following recalculation of page hub and authority scores, and suppression of related-page effects at step 374, program flow advances to step 382 where the results of step 374 are further filtered to remove yet additional sources of spurious effects before required recalculation is undertaken. As described, in addition to self-promotion, related pages from the same Web site; e.g., a home page and several sub-pages of the home page, can improperly accumulate authority weights, giving rise to spurious factors in the form of "related-page" promotion, which adversely affects relevance computation accuracy. In accordance with the invention, it has been found effective to reduce related-page effects at this point in the method; i.e., following step 374 and before iteration of recalculation for convergence. To accomplish this, method 2 includes procedures at step 382 after iteration of the computation, for re-packing the authority of all sites. Specifically, step 382 includes procedures for setting to 0 all, but the page with the largest authority of the same site, the same site being defined in the fashion described in connection with the self-promotion filtering procedure.

Following completion of step 382, method advances to step 376, where method 2 determines whether hub and authority scores have converged toward final values sufficiently to forego further recalculation. As will be appreciated, the interdependence of page hub and authority weights causes page hub and authority scores to reach final values suitable for ranking purposes; i.e., converge adequately for purposes of ranking in accordance with method 2. In this regard it is to be noted that the exact value of hub and/or authority value for a page is not as significant as approximating the page's respective hub and authority relative values for ranking purposes. Therefore, in accordance with the invention, method 2 includes procedures for establishing a criteria, which in preferred form includes performing the iteration 5 times. Accordingly, if final values have not been reached, program flow proceeds over branch 380 to iterate; i.e. to step 374 over program flow branch 384 to step 374 for recalculation of hub and authority scores as previously described. Thereafter, once the required iterations have been accomplished and final values reached, program flow exits step 376 at branch 378.

Following procedures for reaching acceptable final values, program flow advances over branch 378, thereby, concluding step 364 shown in FIG. 15 for iteratively determining page hub and authority scores, and accordingly also concluding step 274 shown in FIG. 12 for ranking pages of the root set by authority, it being understood that the results of the iterative recalculation provide page number identifications ordered by page authority and hub score values; i.e., a distribution of scores that represent the degree of relevance for the respective pages, which scores are ordered by numerical amount to establish ranking of the pages.

Continuing with reference to FIG. 12, upon completion of step 274 for ranking the pages of the root set, method 2 advances program flow to step 278 for truncating the ranked, root set pages i.e., reducing the set size to the number of pages desired by the user. It will be recalled that in connection with description of interface screens 176 and 202, method 2 in preferred form includes steps for providing editing partition 190 with entry field 191 in which the user may specify the number of pages he would like returned following automated determination of pages having the highest authority relative to the frame attributes of the frame selected for population. Method 20 at step 278 includes procedures for the effecting the user's designation of pages to be returned, which designation the user enters at field 191 of interface partition 190.

Figure 18:
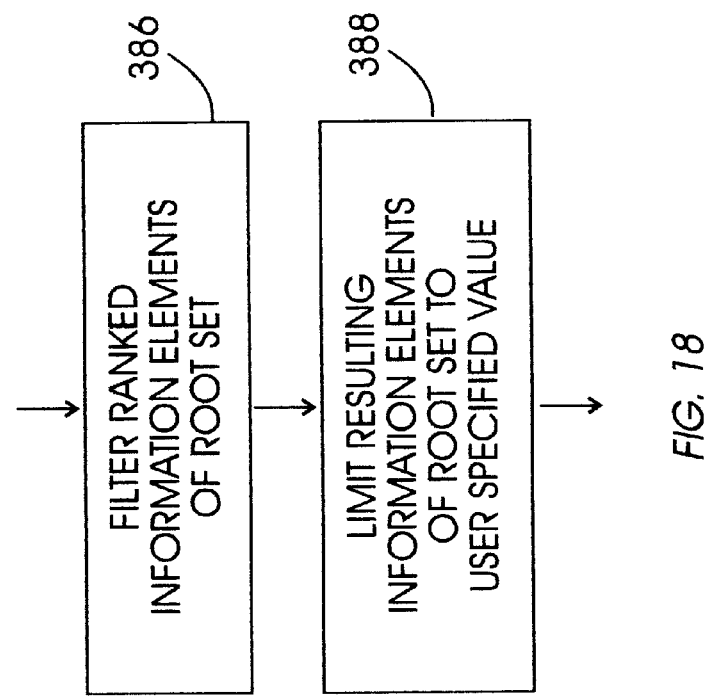
FIG. 18 is a flow diagram illustrating the more specific steps associated with the "Truncate Ranked Information Elements" step of FIG. 12, FIG. 12 itself illustrating the "Populate Selected Frame With Information Elements" general step of the method in accordance with the present invention illustrated in FIG. 9.

As in the case of other steps, method step 278 shown at FIG. 12, is generally in character, and includes more specific steps seen in greater detail in FIG. 18. As presented in FIG. 18, general step 278 first includes step 386 for filtering the ranked pages of the root set.

As noted above with respect to "redundant hubs," the value of a hub page is, by definition, in its links rather than its contents, i.e., "better" hubs having greater numbers of links to authority pages. Accordingly, if all the destinations accessible from a particular hub are also accessible from "better" hubs; i.e., hubs with greater numbers of links, that particular hub need not be outputted. Since method 2 seeks to provide the smallest number of hub pages that together contain as many, unique, high-quality links as possible, method 2 accordingly includes procedures for removing redundant hubs. Specifically, method 2 at step 386 shown in FIG. 18 includes procedures to iteratively generate hubs and authorities. Method 2 outputs the authorities as they stand, however, with respect to hubs, method 2 performs the following filtering. Method 2 begins by supply outputting the best hub, and then diminishes the authority scores of everything that hub points to. Given the new scores, method 2 recomputes hub values. Thereafter, method 2 again outputs the best hub, and diminishes the scores of pages it points to, and thereafter, continues this process until completion; i.e., the a number of hubs acceptable to the user have been returned.

Thereafter, following procedures for diminishing the effect of redundant hubs, method 2 advances to step 388, where as described above, the number of pages in the root set is limited to the value entered by the user at field 191 of interface editing partition 190.

Following execution of step 388, method 2, thereby, concludes step 278 of FIG. 12 for truncating the ranked pages and advances to step 278 where the truncated ranked root set of highest hub and authority pages are returned for populating the selected frame as shown in FIG. 12, and as shown in FIG. 9, concluding step 8. Finally, upon completion of frame populating step 8, subject to method 2 receiving no indication of any remaining frames to be populated at step 10 and no indication of further modifications to the frame hierarchy at step 16, program flow advances over branch 20 to finish.

With regard to operation of method 2 in a typical application, if a user wished to develop a set of high-authority information pages relating to the a particular question; as for example, the development of Web information pages concerning the restoration of a BMW of interest to the user, the method would proceed as follows.

The user would initially activate his personal computer 68 shown in FIG. 1, call up method 2 as embodied in a software application stored at user computer 68, and when prompted at method step 80 shown in FIG. 10, identify an information organizational structure such as structure 100 shown in FIG. 2.

Upon the users identification of structure 100, method 2 would generate screens 140 of interface 138 at users monitor 132 shown in FIG. 5. Thereafter, when presented with screen 140, the user could interactively select frame addition tool 148 at partition 144 and include a new information frame 128 at structure 100 shown in screen partition 142. In accordance with the method, before entering the proposed new frame, the user would be free to review structure 100 to determine where the new frame concerning "BMW restoration" would best be placed. Following that review, the user might judge that since the subject of BMW Restoration applied more to "Business", than to either "Entertainment", "Science", or "News", it would better be placed somewhere beneath frame 108 in the hierarchy. Further upon additional review, the user would likely judge that BMW Restoration would better fall under the subcategory "Companies" at frame 116, than under the subcategory "Finance" at frame 118, and indeed under the frame "Products & Services" at frame 122 rather than "Computers" at frame 120. Accordingly, the user would likely place proposed new frame 128 for BMW Restoration beneath frame 122 concerning "Products& Services" in structure 100. Of course, and as noted above, in view of the flexibility afforded by method 2, the user could place proposed new frame 128 anywhere in structure 100 that he liked on the understanding that new frame 128 would be subject to inclusion of any "parent" frames it was associated with, and compatibility of its attributes with any frames which depended from it.

Following placement of new frame 128, the user would identify the attributes to be associated with the frame, particularly, classification descriptors, example pages and/or stop pages as described previously. More specifically, the user might identify pages of known BMW user groups that include hubs pointing to known BMW restoration facilities and/or techniques. Additionally, the user might identify known authority pages concerning case studies of BMW restorations. Further, the user might enter stop pages concerning BMW parts or pages concerning sale of restored BMWs known not to be of relevance.

In a case at hand, however, for purposes of simplicity of illustration, the frame attributes would be merely the descriptors employed by the user to identify the frame, specifically, the frame title, here "BMW Restoration."

Next, the user would navigate to the screen 176 of interface 138, as for example, by selecting the display mode "Frame" 172 at region 168 of partition 152 shown in FIG. 6. At screen 176, while partition 178 would not include lists 180 and 182, having respectively, authority and hub pages, no population procedure having yet been undertaken, the user, nonetheless, would be presented with editing partition 190 at which he could modify the frame attributes; e.g. by providing entry of frame attributes to be included at field 194, or attributes to be excluded at field 196.

Following finalization of the frame attributes, and designation of the number of pages the user would like to populate new frame 128 with at field 191, and on the assumption that no modification to the frame structure was desired, the user would provide authorization for method 2 to automatically populate frame 128 with a set of ranked pages directed to the frame attributes, specifically, "BMW Restoration."

Thereafter, method 2 would undertake automatic formulation of a query based on the frame attributes, particularly, "BMW" and "Restoration" as shown generally at step 270 of FIG. 12. Next, method 2 would retrieve an initial set of pages 300 as shown in FIG. 8, including "hits" 356 for the respective search terms "BMW" and "Restoration" and links 312 to related pages as shown at pages 302 to 310 of FIG. 8.

Following identification and retrieval of the initial set, method 2 would proceed to step 272 as shown in FIG. 12 to expand initial set 300 to root set 354. As described, method 2 would accomplish expansion of the initial set by parsing the links from initial pages 304 to 310 and employing means such as crawlers and link libraries to identify pages located one link away from the respective pages of initial set 300, to include pages 314 to 352 as seen in FIG. 8.

Once method 2 has expanded the initial set to the root set as shown in FIG. 12 at step 272, method 2 would proceed to step 274 for ranking the pages of the root set by authority as explained above. And, thereafter, method 2 would advance to step 276 shown in FIG. 12 where the ranked pages of the root set would be truncated i.e. reduced in accordance with the specification provided by the user at entry field 191 of editing partition 190 above described.

Figure 4A:
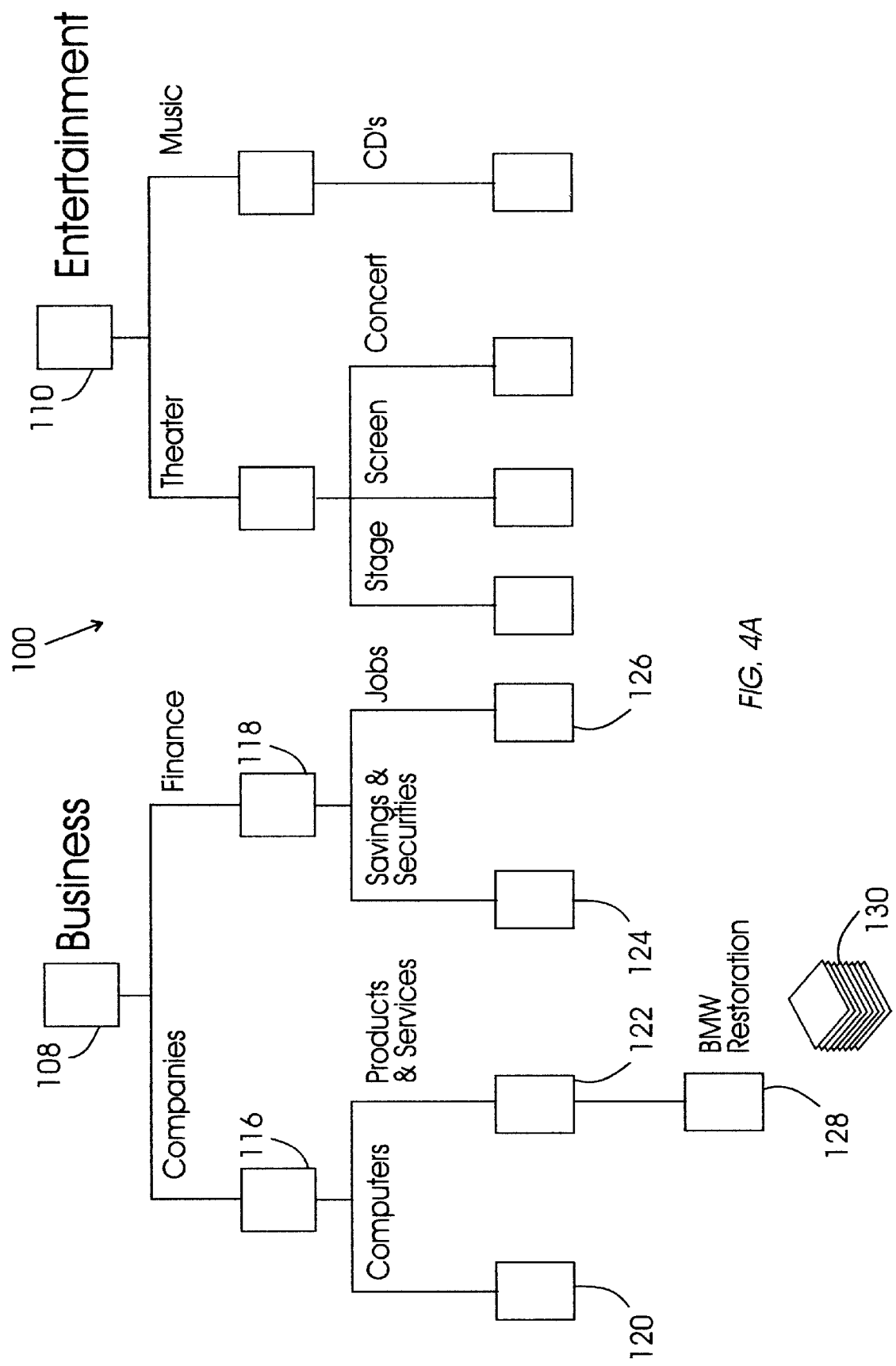
FIGS. 4(A–B) is a diagram illustrating a hierarchical organization of information suitable for being maintained in a frame-based, hierarchical database in which a new information frame has been added and populated with Web pages in accordance with the method of the present invention.
Figure 4B:
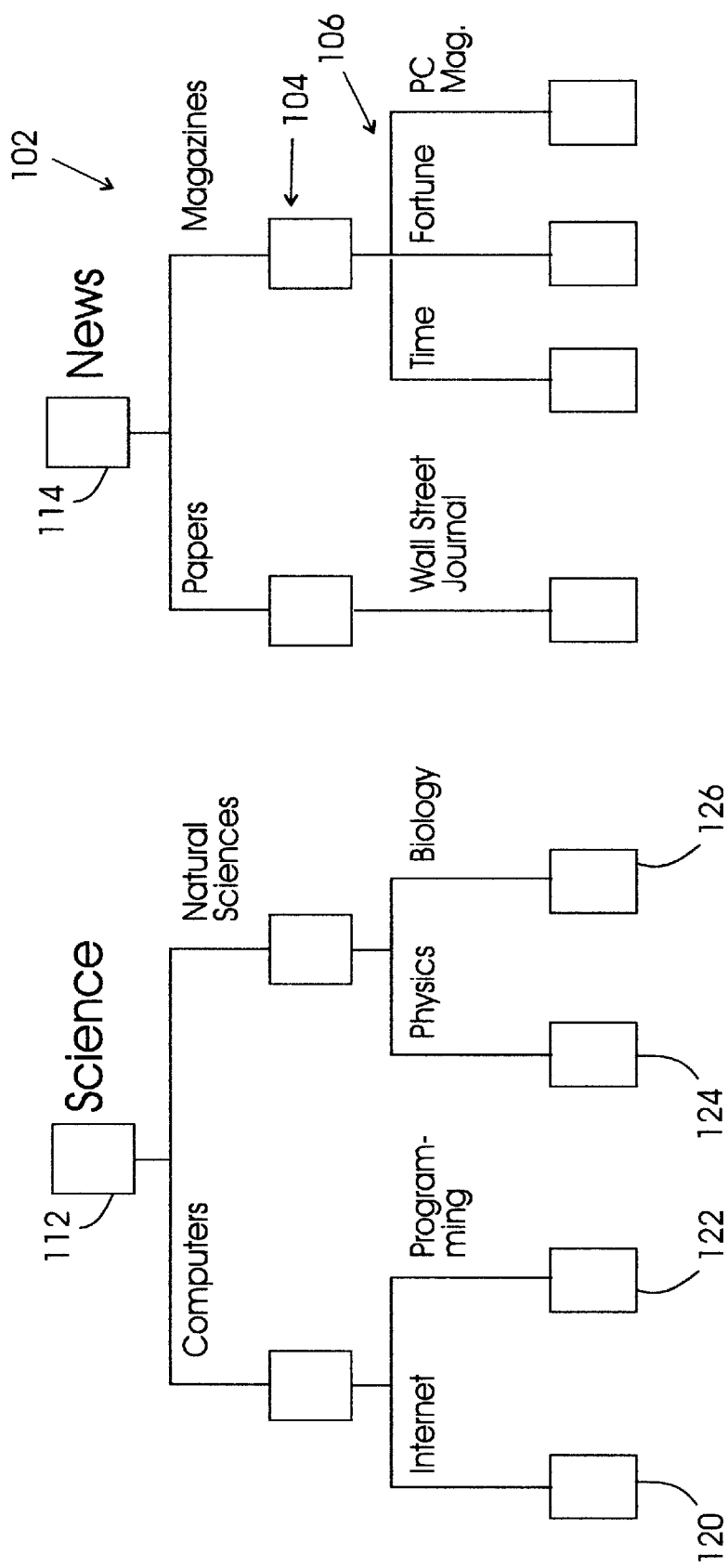

And, once the pages of the root set ranked by authority were reduced to the requested number; i.e. truncated, method 2 would return the pages as set 130 shown in FIG. 4 to populate selected frame 128, "BMW Restoration."

Following return of the population of pages to frame 128, the user at interface 138 and associated screens 176 and 202 shown in FIGS. 6, 7, could review lists 180 and 182 of, respective, authority and hub pages and their contact to determine whether the page population was acceptable, or whether, modifications should be entered at editing partition 190 to the frame attributes to, thereby, modify the frame population with a new population, again retrieved as above described. As will be appreciated, this interactive and iterative process would continue at the user's discretion until the page population provided at frame 128 was acceptable. Once the page population was found acceptable, the user could then terminate method 2.

While this invention has been described in its preferred form, it will be appreciated that changes may be made in the form, procedure and sequences of its various steps and elements without departing from its spirit or scope.

What we claim is:

1. A method for cataloging and ranking information comprising the steps of:
   a. enabling a user to interactively define a structure for cataloging information in one or more categories, each category having one or more attributes for defining the category;
   b. selecting a category of the structure;
   c. identifying a population of information elements for the selected category automatically based upon the respective category attributes;
   d. ranking the information elements for the particular category automatically based upon relevance to category attributes; and
   e. populating the selected category with ranked information elements.

2. The method of claim 1 further including filtering the information elements to improve ranking accuracy.

3. The method of claim 2 wherein filtering includes applying filtering at predetermined points during ranking.

4. The method of claim 3 wherein identifying information elements includes identifying links between information elements, and ranking information elements includes iteratively determining relevance of the information elements to the respective category attributes based upon the affinity between information elements, and wherein one or more sources of spurious effects arise during the determining of relevance which adversely affect ranking accuracy, and wherein filtering includes steps for diminishing one or more sources of spurious effects.

5. The method of claim 4 wherein the sources of spurious effects include self-promotion and filtering includes steps for diminishing the effects of self promotion.

6. The method of claim 5 wherein the filtering steps for diminishing the effects of self-promotion include discarding links from information elements of a first source of information elements to information elements of a second source of information elements, where the first information source and the second information source are the same.

7. The method of claim 6 wherein the information elements are pages of the World Wide Web, and information sources for the pages are Web sites, the Web including at least four classes of Web sites designated, respectively, class A, class B, class C and class D, each respective class having a Web address including four octets of identification, and wherein Web sites are considered the same where: the two most significant octets of the addresses for class A and class B sites are the same; and the three most significant octets of the addresses for class C sites are the same; and all four octets of the addresses for class D sites are the same.

8. The method of claim 6 wherein the filtering steps for diminishing the effects of self-promotion are applied proximate the beginning of determining information element ranking.

9. The method of claim 4 wherein the information elements include hubs and authorities, and the sources of spurious effects include redundant hubs, and wherein filtering includes steps for diminishing the effects of redundant hubs.

10. The method of claim 9 wherein the filtering steps for diminishing the effects of redundant hubs includes identifying a hub having the highest number of links at approximately the end of a ranking iteration, and setting to zero the authority values of information elements that are linked to by the hub having the highest number of links, re-computing hub values and iterating determination of ranking.

11. The method of claim 9 wherein the filtering steps for diminishing the effects of redundant hubs are applied proximate the end of determining information element ranking.

12. The method of claim 4 wherein the information elements include hubs and authorities, and the sources of spurious effects include false authority, and wherein filtering includes steps for diminishing the effects of false authority.

13. The method of claim 12 wherein the filtering steps for diminishing the effects of false authority includes allowing each link in an information element to have its own hub value, such that the hub value of the information element becomes a function of the particular link, and, when ranking authorities, allowing a value associated with the authority to be incremented by the hub value of the link, and when ranking hubs, allowing, the value of the authority linked to, be used to increment the hub value.

14. The method of claim 12 wherein the filtering steps for diminishing the effects of false authority are applied during the determining of information element ranking.

15. The method of claim 4 wherein the information elements include hubs and authorities, and the sources of spurious effects include related-page factors, and wherein filtering includes steps for diminishing the effects of related-page factors.

16. The method of claim 15 wherein the filtering steps for diminishing related-page factors includes, re-packing the authority of any source of information elements prior to iterating a determination of ranking by setting to zero all authority values of the same information element source, except the largest authority value.

17. The method of claim 16 wherein the information elements are pages of the World Wide Web, and information sources for the pages are Web sites, the Web including at least four classes of Wed sites designated, respectively, class A, class B, class C and class D, each respective class having a Web address including four octets of identification, and wherein Web sites are considered the same where: the two most significant octets of the addresses for class A and class B sites are the same; and the three most significant octets of the addresses for class C sites are the same; and all four octets of the addresses for class D sites are the same.

18. The method of claim 15 wherein the filtering steps for diminishing the effects of related-page factors are applied during the determining of information element ranking.

19. The method of claim 4 wherein the sources of spurious effects include self-promotion; redundant hubs; false authority; and related-page factors; and filtering includes steps for diminishing the spurious effects by combining steps for reducing self-promotion, redundant hubs; false authority and related page factors, and wherein the filtering steps for diminishing the effects of self-promotion are applied proximate the beginning of determining information element ranking; filtering steps for diminishing the effects of redundant hubs are applied proximate the end of determining information element ranking; filtering steps for diminishing the effects of false authority are applied during the determining of information element ranking; and filtering steps for diminishing the effects of related-page factors are applied during the determining of information element ranking prior to iteration of ranking determinations.

20. The method of claim 1 wherein enabling a user to define an information structure includes providing a display interface having fields at which the user can enter attributes to be associated with the information structure categories.

21. The method of claim 20 wherein identifying a population of information elements includes automatically generating a search query based upon the category attributes entered at the interface.

22. The method of claim 21 wherein providing the interface includes providing the interface with one or more screens, respectively, having one or more partitions.

23. The method of claim 22 wherein providing the interface with one or more screens, respectively, having one or more partitions, includes providing at least one partition for enabling modification of category attributes.

24. The method of claim 23 wherein enabling modification of category attributes includes providing an entry field permitting the user to add attributes.

25. The method of claim 24 wherein enabling modification of category attributes includes providing an entry fields permitting the user to delete attributes.

26. The method of claim 25 wherein enabling modification of category attributes includes providing an entry field permitting the user to exclude attributes.

27. The method of claim 26 wherein enabling modification of category attributes includes permitting the user to select predefined attributes with which known information elements are associated.

28. The method of claim 22 wherein providing the interface with one or more screens having one or more partitions, includes providing at least one partition for presenting the information structure.

29. The method of claim 28 wherein providing the interface with at least one partition for presenting the information structure includes providing at least one partition for presenting a graphical representation of the information structure and for enabling modification of the information structure.

30. The method of claim 29 wherein enabling modification of the information structure includes enabling the adding, deleting, and moving of categories within the information structure.

31. The method of claim 22 wherein providing the interface with one or more screens having one or more partitions, includes providing at least one partition for presenting one or more information elements having information content which populate a selected category of the information structure.

32. The method of claim 31 wherein providing the interface with one or more screens having one or more partitions, includes providing at least one partition for presenting the contents of a selected information element.

33. The method of claim 22 wherein providing the interface with one or more screens having one or more partitions, includes enabling navigation between screens, and further includes providing at least one partition for presenting the information structure and at least one partition for enabling modification of category attributes.

34. The method of claim 33 wherein providing the interface with one or more screens having one or more partitions includes providing at least one partition for presenting one or more information elements having information content which populate the selected category of the information structure.

35. The method of claim 34 wherein providing the interface with one or more screens having one or more partitions further includes providing at least one partition for presenting the content of an information elements which populates the selected category of the information structure.

36. A method for cataloging ranking and filtering information comprising the steps of:
   a. presenting a display interface to a user, the interface having one or more screens, respectively, having one or more partitions for enabling the user to interactively define a structure for cataloging information in one or more categories, each category having one or more attributes for defining the category;
   b. enabling the user to select a category of the structure;
   c. automatically identifying a population of information elements for the selected category based upon the respective category attributes designated by the user, and further, identifying links between information elements;
   d. ranking the information elements for the particular category automatically based upon relevance to category attributes by iteratively determining relevance of the information elements to the respective category attributes based upon the affinity between information elements; wherein one or more sources of spurious effects arise during the determining of relevance which adversely affect ranking accuracy;
   e. filtering the information elements to improve ranking accuracy by applying filtering at predetermined points during ranking; and
   f. populating the selected category with ranked information elements.

37. The method of claim 36 wherein providing the interface with one or more screens having one or more partitions, includes providing at least one partition for presenting the information structure and at least one partition for enabling modification of category attributes and at least one partition for presenting one or more information elements having information content.

38. The method of claim 37 wherein the sources of spurious effects include self-promotion and filtering includes steps for diminishing the effects of self-promotion applied proximate the beginning of determining information element ranking.

39. The method of claim 37 wherein the sources of spurious effects include redundant hubs and filtering includes steps for diminishing the effects redundant hubs applied proximate the end of determining information element ranking.

40. The method of claim 37 wherein the sources of spurious effects include false authority and filtering includes steps for diminishing the effects of false authority applied during the determining of information element ranking.

41. The method of claim 37 wherein the sources of spurious effects include related-page factors and filtering includes steps for diminishing the effects of related-page factors applied during the determining of information element ranking.

42. A method for displaying an interface at which a user may interactively develop a structure for cataloging information in one or more categories, each category having one or more attributes for defining the category, and at which interface the user may automatically populate selected categories with information elements, the method comprising the steps of;
   a. providing the interface with one or more screens, respectively, having one or more partitions;
   b. providing at least one partition for presenting the information structure and enabling its modification;
   c. providing at least one partition for presenting the attributes of a selected category and enabling modification of category attributes; and
   d. enabling automatic identification of a population of information elements with a search query based upon the category attributes entered at the interface.

43. The method of claim 42 wherein providing the interface includes providing fields at which the user can enter attributes to be associated with the information structure categories.

44. The method of claim 43 wherein providing the interface with one or more screens having one or more partitions, includes enabling navigation between screens and providing at least one partition for presenting one or more information elements having information content which populate a selected category of the information structure.

45. The method of claim 43 wherein providing the interface with one or more screens having one or more partitions further includes providing at least one partition for presenting the content of an information elements which populates the selected category of the information structure.

46. The method of claim 45 wherein enabling modification of category attributes includes providing an entry field permitting the user to add attributes.

47. The method of claim 45 wherein enabling modification of category attributes includes providing an entry fields permitting the user to delete attributes.

48. The method of claim 45 wherein enabling modification of category attributes includes providing an entry field permitting the user to exclude attributes.

49. The method of claim 45 wherein enabling modification of category attributes includes permitting the user to select predefined attributes with which known information elements are associated.

50. The method of claim 45 wherein enabling modification of the information structure includes enabling the adding, deleting, and moving of categories within the information structure.

* * * * *